United States Patent
Sakurai et al.

(10) Patent No.: US 6,821,616 B1
(45) Date of Patent: Nov. 23, 2004

(54) PROTECTIVE THIN FILM FOR FPDS, METHOD FOR PRODUCING SAID THIN FILM AND FPDS USING SAID THIN FILM

(75) Inventors: Hideaki Sakurai, Saitama-ken (JP); Yukiya Yamashita, Saitama-ken (JP); Yoshirou Kuromitsu, Saitama-ken (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 09/457,743

(22) Filed: Dec. 10, 1999

(30) Foreign Application Priority Data

Dec. 10, 1998 (JP) .......................................... 10-351167
May 20, 1999 (JP) .......................................... 11-139766
May 18, 1999 (JP) .......................................... 11-136599
Jun. 29, 1999 (JP) .......................................... 11-182814

(51) Int. Cl.[7] ................................................. B32B 9/04
(52) U.S. Cl. ........................ 428/332; 428/336; 428/696
(58) Field of Search ................................ 428/336, 696, 428/332; 427/248.1

(56) References Cited

U.S. PATENT DOCUMENTS 5,496,583 A * 3/1996 Jansen et al. ................ 427/109
5,891,531 A * 4/1999 Konishi et al. ............... 427/564

FOREIGN PATENT DOCUMENTS

JP         10-149767       *    6/1998

* cited by examiner

*Primary Examiner*—Monique R. Jackson
(74) *Attorney, Agent, or Firm*—Oblon, Spivak, McClelland, Maier & Neustadt, P.C.

(57) ABSTRACT

The present invention provides a protecting film capable of preventing deterioration in adhesion and matching to a substrate (dielectric layer), and deterioration in electric insulation. The protecting film includes a film body composed of MgO or the like which is inhibited from reacting with $CO_2$ gas and $H_2O$ gas in air to prevent degeneration of MgO or the like into $MgCO_3$ and $Mg(OH)_2$, etc. harmful to FPD. The film body is formed on the surface of the substrate, and the fluoride layer is formed on the surface of the film body. The fluoride layer is represented by $MO_XF_Y$ (M is Mg, Ca, Sr, Ba, an alkali earth complex metal, a rare earth metal, or a complex metal of an alkali earth metal and a rare earth metal, $0 \leq X < 2$, and $0 < Y \leq 4$), and is obtained by reaction of a gaseous fluorinating agent with MaO or the like. As the gaseous fluorinating agent, a fluorine gas, a hydrogen fluoride gas, $BF_3$, $SbF_5$ or $SF_4$ is preferably used.

5 Claims, 5 Drawing Sheets

PROTECTIVE THIN FILM FOR FPDS, METHOD FOR PRODUCING SAID THIN FILM AND FPDS USING SAID THIN FILM

BACKGROUND OF THE INVENTION

1. Field of the Invention

The present invention relates to a protecting film for FPD (Flat Panel Display) such as PDP (Plasma Display Panel), PALC (Plasma Addressed Liquid Crystal Display), and the like, a method of producing the same, and FPD using the same.

2. Description of the Related Art

As a method of forming a protecting film at low cost with excellent productivity as compared with a method of forming a FPD protecting film using a vacuum process such as an electron beam deposition process, a sputtering process, an ion plating process, or the like, various methods have been proposed. These proposed methods use a wet process such as a screen printing process, a spin coating process, a spray coating process, or the like using paste or a coating solution containing a MgO powder, a $Mg(OH)_2$ powder, a mixture of MgO powder and $Mg(OH)_2$ powder, or a rare earth oxide powder (for example, Japanese Unexamined Patent Publication Nos. 3-67437, 7-220640, 7-147136, 7-335134, 8-111177, 8-111178, 8-212917, 6-325696, 8-167381, 8-264125, 9-12940, 9-12976, 8-96718, etc.).

As this type of protecting film, a secondary electron emitting material for a plasma display panel is disclosed, which comprises a pair of discharge maintaining electrodes, a dielectric layer and a protecting layer, which are laminated on a back glass substrate, a fluorescent layer formed on the rear side of a front glass substrate, and an inert gas sealed between both substrates and emitting ultraviolet rays by discharge, the protecting layer being composed of a secondary electron emitting material such as fluorinated MgO (Japanese Unexamined Patent Publication No. 7-201280). In this secondary electron emitting material, oxygen of MgO which constitutes the protecting layer is partially replaced by fluorine. Namely, the oxygen atoms of a lattice which forms a MgO ion crystal are partially replaced by fluorine atoms to form fluorinated MgO represented by the formula $MgO_{1-X-Y}F_Y$ (wherein $0<X<1$ and $0<y<1$).

This secondary electron emitting material for a plasma display panel uses fluorinated MgO represented by $MgO_{1-x-y}F_y$ as the protecting layer, and thus forms localized levels by valence control, thereby decreasing the break-down voltage. As a result, it is possible to form a high-definition panel, and obtain a protecting film stable with the passage of time.

On the other hand, as a PDP protecting film which is directly exposed to a discharge space and is thus a key material playing the most important role in discharge characteristics, a MgO film having the high secondary electron emitting ability, and excellent sputtering performance, light transmission, and insulating property is conventionally used.

However, the MgO film is easily degenerated due to reaction with $CO_2$ and $H_2O$ when exposed to air during the process. Therefore, it is known that in order to obtain the original characteristics of MgO, degassing evacuation must be carried out under vacuum and heating for a long time after panel sealing (for example, Latest Plasma Display Manufacturing Technology, edited by Sato, Press Journal, p. 118–123 and p. 291–295 (1997)). This is because impurity gases of $H_2O$, $H_2$, $O_2$, CO, $CO_2$, $N_2$, and the like adversely affect discharge characteristics of PDP and a constituent material of a panel, and particularly, contamination with $CO_2$ deteriorates panel characteristics to an unrecoverable level.

Therefore, in order to prevent degeneration of MgO, it has been proposed to coat the surface of MgO with another material having low moisture permeability (Japanese Unexamined Patent Publication No. 10-149767, and W, T, Lee et al; "$LaF_3$ coated MgO protecting layer in AC-Plasma Display Panels", IDW'98, P. 72–75).

The above Japanese Unexamined Patent Publication No. 10-149767 discloses a method of manufacturing PDP comprising forming a protecting film, forming a temporary protecting film with low moisture permeability on the protecting film, and then removing the temporary protecting film. In this method, the surface of the protecting film is protected by the temporary protecting film during manufacture of PDP, preventing the formation of a degenerated layer on the surface of the protecting film. As a result, a protecting film having good discharge characteristics can be obtained, and pyrolysis of the degenerated layer of the protecting film is made unnecessary.

The above document of W. T. Lee et al proposes that $LaF_3$ coating having low moisture permeability on a MgO protecting film can suppress degeneration of the MgO protecting film, and realize a higher degree of secondary-electron emitting property and a lower degree of discharge property.

However, in the conventional method of forming a protecting film disclosed in each of the above publications, a MgO powder, a $Mg(OH)_2$ powder, a MgO powder obtained by burning a mixture of MgO powder and $Mg(OH)_2$ powder, or a rare earth oxide powder comprises fine particles and thus has a large surface area, thereby causing the probability that the surfaces relatively readily react with carbon dioxide and moisture in air to form a carbonate and hydroxide. There is thus a problem in that carbon dioxide and moisture are released to the discharge space during discharge of PDP to deteriorate discharge characteristics.

In addition, the secondary-electron emitting material for a plasma display panel disclosed in Japanese Unexamined Patent Publication No. 7-201280 comprises a protecting layer composed of fluorinated MgO represented by $MgO_{1-x-y}F_y$, and thus has a problem in that since a difference between the thermal expansion coefficients of the protecting layer and a substrate (dielectric layer) is relatively large, the protecting layer and the substrate (dielectric layer) have low adhesion and matching therebetween, and poor electric insulation as compared with the use of a MgO film as a protecting layer.

Furthermore, the PDP manufacturing method disclosed in Japanese Unexamined Patent Publication No. 10-149767 and the document of W. T. Lee et al is difficult to match the temporary protecting film and the protecting film in formation of the temporary protecting film, and thus causes cracks in the temporary protecting film or peeling of the temporary protecting film, thereby causing the insufficient effect of preventing degeneration of the protecting film by the temporary protecting film. A possible method of improving this is to coat a thick temporary protecting film on a protecting film. However, this method has the problem of producing large amounts of impurities (decomposition products of the temporary protecting film) in removal of the temporary protecting film.

Furthermore, the document of W. T. Lee et al discloses that $LaF_3$ is coated to 5 to 90 nm on MgO. However, such a two-layer structure has a problem in that the break-down voltage is rapidly changed when the LaF$_3$ upper layer film is removed by sputtering, thereby failing to obtain a sufficient life time.

SUMMARY OF THE INVENTION

Accordingly, a first object of the present invention is to provide a FPD protecting film and a method of producing the same which is capable of preventing deterioration in adhesion and matching with a substrate (dielectric layer), and preventing deterioration in electric insulation.

A second object of the present invention is to provide a FPD protecting film and a method of producing the same which is capable of inhibiting or suppressing reaction of MgO or the like in a film body, a film or the protecting film with CO$_2$ gas and H$_2$O gas in air to prevent or suppress degeneration of MgO to MgCO$_3$, Mg(OH)$_2$, etc. harmful to FPD, i.e., capable of improving the environment resistance of the film body, the film or the protecting film.

A third object of the present invention is to provide a FPD protecting film and a method of producing the same which is capable of preventing or suppressing the formation of a carbonate (MgCO$_3$ or the like), a hydroxide (Mg(OH)$_2$), etc. of MgO before the formation of a fluoride layer on the surface of a film body to shorten the time of the vacuum evacuation heating step or omit the vacuum evacuation heating step during manufacture of FPD.

A fourth object of the present invention is to provide a FPD protecting film and a method of producing the same which permits the relatively easy formation of a fluoride layer with a high secondary-electron emitting ability on the surface of a film body or the surfaces of MgO powder which constitutes the film.

A fifth object of the present invention is to provide FPD using a protecting film which is capable of significantly decreasing the number of production steps.

A sixth object of the present invention is to provide a method of producing a FPD protecting film, which is capable of improving matching between a fluoride layer and a protecting film to prevent the occurrence of cracks in the fluoride layer and peeling of the fluoride layer in the FPD manufacturing process, and improve the effect of preventing degeneration of the protecting film by the fluoride layer.

A seventh object of the present invention is to provide a FPD protecting film and a method of producing the same which permits the removal of a fluoride layer after assembly of FPD to improve the discharge characteristics.

In accordance with the present invention, as shown in FIGS. 1 and 2, a FPD protecting film comprises a film body 14$a$ formed on a substrate 13 and made of any of MgO, CaO, SrO, BaO, alkali earth compound oxides, rare earth oxides, and compound oxides of alkali earth oxides and rare earth oxides; and a fluoride layer 14$b$ formed on the surface of the film body 14$a$.

In the FPD protecting film the surface of the film body 14$a$ is coated with the fluoride layer 14$b$, and thus MgO or the like in the film body 14$a$ little reacts with CO$_2$ gas and H$_2$O gas in air even when the protecting film 14 is exposed to air for a long time in the process for manufacturing FPD 10 (refer to FIG. 2). As a result, MgO or the like in the film body 14$a$ is little degenerated to MgCO$_3$ and Mg(OH)$_2$ which possibly deteriorate the function of the FPD 10.

Since the film body 14$a$ having substantially the same thermal expansion coefficient as the substrate 13 is bonded to the substrate 13, the protecting film 14 is not separated from the substrate 13 due to a heat cycle, thereby causing high adhesion and matching between the protecting film 14 and the substrate 13.

In accordance with the present invention, as shown in FIGS. 3 and 4, a FPD protecting film comprises a film body 34$a$ formed on a substrate 13 and made of any one of MgO, CaO, SrO, BaO, alkali earth compound oxides, rare earth oxides, and compound oxides of alkali earth oxides and rare earth oxides, wherein the film body 34$a$ is formed by using a fluoride layer-coated powder of any one of MgO, CaO, SrO, BaO, alkali earth compound oxides, rare earth oxides, and compound oxides of alkali earth oxides and rare earth oxides.

In the FPD protecting film the surfaces of MgO powder particles or the like are coated with fluoride layers, and thus MgO or the like in the film body 34$a$ little reacts with CO$_2$ gas and H$_2$O gas in air even when the protecting film 34 is exposed to air in the manufacturing process (refer to FIG. 4). As a result, MgO or the like in the film body 34$a$ is little degenerated to MgCO$_3$, Mg(OH)$_2$, etc. having the probability of deteriorating the function of FPD 10. Since the fluoride layers coated on the surfaces of MgO powder or the like are very thin, the mechanical characteristics of the MgO powder or the like are substantially the same as a MgO powder or the like with no fluoride layer coated on the surfaces thereof.

The fluoride layer 14$b$ is preferably represented by MO$_X$F$_Y$ (M is Mg, Ca, Sr, Ba, an alkali earth complex metal, a rare earth metal, or a complex metal of an alkali earth metal and a rare earth metal, $0 \leq X < 2$, and $0 < Y \leq 4$).

The fluoride layer 14$b$ is preferably obtained by reaction of a gaseous fluorinating agent with any one of MgO, CaO, SrO, BaO, alkali earth compound oxides, rare earth oxides, and compound oxides of alkali earth oxides and rare earth oxides.

Furthermore, as the gaseous fluorinating agent, any one of fluorine gas, hydrogen fluoride gas, BF$_3$, SbF$_5$ and SF$_4$, particularly, fluorine gas or hydrogen fluoride gas, is preferably used. The thickness of the fluoride layer is preferably set in the range of 0.1 to 1000 nm.

In accordance with the present invention, a method of producing a FPD protecting film comprises forming a film body 14$a$ on a substrate 13 by using any one of MgO, CaO, SrO, BaO, alkali earth compound oxides, rare earth oxides, and compound oxides of alkali earth oxides and rare earth oxides; and treating the surface of the film body with a gaseous fluorinating agent to form a fluoride layer 14$b$ on the surface of the film body 14$a$, as shown in FIGS. 1 and 2.

In the method of producing a FPD protecting film, MgO or the like in the film body 14$a$ is little degenerated to MgCO$_3$ and Mg(OH)$_2$ which are harmful to the function of the FPD 10 (refer to FIG. 2), thereby shortening the time of the subsequent degassing step for removing MgCO$_3$ and Mg(OH)$_2$ or omitting the subsequent degassing step.

In accordance with the present invention, a method comprises forming a film body 14$a$ on a substrate 13 in a vacuum, and treating the surface of the film body 14$a$ with a gaseous fluorinating agent in a vacuum or an inert gas atmosphere without exposing the film body 14$a$ to air to form a fluoride layer 14$b$ on the surface of the film body 14$a$, as shown in FIGS. 1 and 2.

In the method of producing a FPD protecting film, after the film body 14$a$ is formed on the surface of the substrate 13, the film body 14$a$ is not exposed to air before the fluoride layer 14$b$ is formed on the surface of the film body 14$a$, thereby preventing or suppressing the production of carbonate (MgCO$_3$, or the like) and hydroxide (Mg(OH)$_2$, or the like) of MgO, which are harmful to the FPD, on the surface of the film body 14a.

In accordance with the present invention, a method comprises forming a film body 14a on a substrate 13 in a vacuum, burning the film body 14a in air after exposing the film body 14a to air to activate the film body 14a, and treating the surface of the film body 14a with a gaseous fluorinating agent to form a fluoride layer 14b on the surface of the film body 14a, as shown in FIGS. 1 and 2.

In the method of producing a FPD protecting film, after the film body 14a is formed on the surface of the substrate 13, the film body 14a is exposed to air and burned in air to be activated. Therefore, even when carbonate ($MgCO_3$, or the like) and hydroxide ($Mg(OH)_2$, or the like) of MgO, which are harmful to the FPD, are formed on the surface of the film body 14a, the carbonate ($MgCO_3$, or the like) and hydroxide ($Mg(OH)_2$, or the like) of MgO are removed as $CO_2$, and $H_2O$ by burning in air. In this state, the fluoride layer 14b is formed on the surface of the film body 14a to protect the surface of the film body 14a by the fluoride layer 14b, thereby preventing and suppressing the formation of carbonate ($MgCO_3$, or the like) and hydroxide ($Mg(OH)_2$, or the like) of MgO.

In accordance with the present invention, a method further comprises activating the film body 14a before, during or after the substrate 13 on which the film body 14a and the fluoride layer 14b are formed is assembled into a panel.

In the method of producing a FPD protecting film, since the film body 14a is activated by burning after the fluoride layer 14b is formed on the surface of the film body 14a, even when hydroxide ($Mg(OH)_2$, or the like) of MgO or the like is formed a little on the film body 14a, the hydroxide can be removed as $H_2O$, thereby decreasing the rate of recontamination of the film body 14a with atmospheric moisture.

In accordance with the present invention, a method of producing a FPD protecting film comprises treating, with a gaseous fluorinating agent, the surfaces of a powder of any one of MgO, CaO, SrO, BaO, alkali earth compound oxides, rare earth oxides, and compound oxides of alkali earth oxides and rare earth oxides to coat fluoride layers on the powder surfaces of any one of MgO, CaO, SrO, BaO, alkali earth compound oxides, rare earth oxides, and compound oxides of alkali earth oxides and rare earth oxides; mixing a binder, a solvent and the fluoride layer-coated powder of any one of MgO, CaO, SrO, BaO, alkali earth compound oxides, rare earth oxides, and compound oxides of alkali earth oxides and rare earth oxides to prepare paste or a dispersion for a film; and forming a film body 34a on the surface of a substrate 13 by using the paste or dispersion for a film, as shown in FIGS. 3 and 4.

In the method of producing a FPD protecting film, since MgO or the like in the film body 34a is little degenerated to $MgCO_3$, $Mg(OH)_2$, etc. harmful to the function of the FPD 10 (refer to FIG. 4), it is possible to shorten the time of the subsequent degassing step for removing the $MgCO_3$, $Mg(OH)_2$, etc., or omitting the subsequent degassing step, thereby decreasing the manufacturing cost of the FPD 10.

In the method according to the present invention, the film body 14a made of any one of MgO, CaO, SrO, BaO, alkali earth compound oxides, rare earth oxides, and compound oxides of alkali earth oxides and rare earth oxides, or the powder of any one of MgO, CaO, SrO, BaO, alkali earth compound oxides, rare earth oxides, and compound oxides of alkali earth oxides and rare earth oxides is preferably surface-treated with the gaseous fluorinating agent under pressure of 1 to 760 Torr.

In the method, as the gaseous fluorinating agent, any one of fluorine gas, hydrogen fluoride gas, $BF_3$, $SbF_5$, and $SF_4$, particularly fluorine gas or hydrogen fluoride gas, is preferably used.

A powder of any one of MgO, CaO, SrO, BaO, alkali earth compound oxides, rare earth oxides, and compound oxides of alkali earth oxides and rare earth oxides is coated with a fluoride layer in order to form a FPD protecting film 34.

The thickness of the fluoride layer coated on the powder is preferably 0.1 to 1000 nm.

The paste for a film is prepared by mixing a binder, a solvent, and the fluoride layer-coated powder of any one of MgO, CaO, SrO, BaO, alkali earth compound oxides, rare earth oxides, and compound oxides of alkali earth oxides and rare earth oxides.

The dispersion for a film is prepared by mixing a binder, a solvent, and the fluoride layer-coated powder of any one of MgO, CaO, SrO, BaO, alkali earth compound oxides, rare earth oxides, and compound oxides of alkali earth oxides and rare earth oxides.

The use of the paste or dispersion for a film containing the fluoride layer-coated powder permits easy formation of a film body.

The FPD uses a protecting film.

The FPD of the present invention permits a significant decrease in number of steps for manufacturing FPD, and manufacture at low cost.

In accordance with the present invention, a method of producing a FPD protecting film comprises forming, on the surface of a substrate 13, a protecting film 54 made of any one of alkali earth metal oxides, alkali earth metal compound oxides, rare earth metal oxides, and compound oxides of alkali earth metals and rare earth metals treating the surface of the protecting film 54 with a gaseous fluorinating agent to form a fluoride layer 55 on the surface of the protecting film 54; and then removing the fluoride layer 55 after FPD is assembled by using the substrate 13, as shown in FIG. 5.

In the method of producing a FPD protecting film, the protecting film 54 is reacted directly with the gaseous fluorinating agent to form the fluoride layer 55 on the surface of the protecting film 54, thereby coating the surface of the protecting film 54 with the fluoride layer 55. Therefore, even when the protecting film 54 is exposed to air for a long time during the process for manufacturing the FPD 10, the protecting film 54 little reacts with $CO_2$ gas and water vapor in air. As a result, the protecting film 54 is little degenerated to a carbonate, a hydroxide, etc., of an alkali earth metal oxide or the like, which have the probability of deteriorating the function of the FPD 10. On the other hand, it is possible to prevent the occurrence of cracking in the fluoride layer 55 and separation thereof because of good matching between the fluoride layer 55 and the protecting film 54, thereby improving the degeneration protecting effect of the protecting film 54.

The fluoride layer is preferably represented by $MO_XF_Y$ (wherein M is Mg, Ca, Sr, Ba, and alkali earth complex metal, a rare earth metal, or a complex metal of an alkali earth metal and a rare earth metal, $0 \leq X < 2$, and $0 < Y \leq 4$). The fluoride layer is preferably obtained by reaction of the gaseous fluorinating agent with any one of alkali earth metal oxides, alkali earth metal compound oxides, rare earth metal oxides, and compound oxides of alkali earth metals and rare earth metals.

Furthermore, as the gaseous fluorinating agent, any one of fluorine gas, hydrogen fluoride gas, $BF_3$, $SbF_5$ and $SF_4$, particularly fluorine gas or hydrogen fluoride gas, is preferably used. The thickness of the fluoride layer is preferably set in the range of 0.1 to 1000 nm.

In accordance with the present invention, the FPD protecting film 54 is produced as shown in FIG. 5.

The FPD 10 uses the protecting film 54 as shown in FIG. 5(d).

In the FPD protecting film 54, the fluoride layer 55 is removed after assembly of the FPD 10, thereby improving discharge characteristics of the FPD 10.

DESCRIPTION OF THE PREFERRED EMBODIMENT

A first embodiment of the present invention will be described with reference to the drawings.

Examples of FPD of the present invention include PDP, PALC, and the like. This embodiment relates to PDP.

Figure 1:
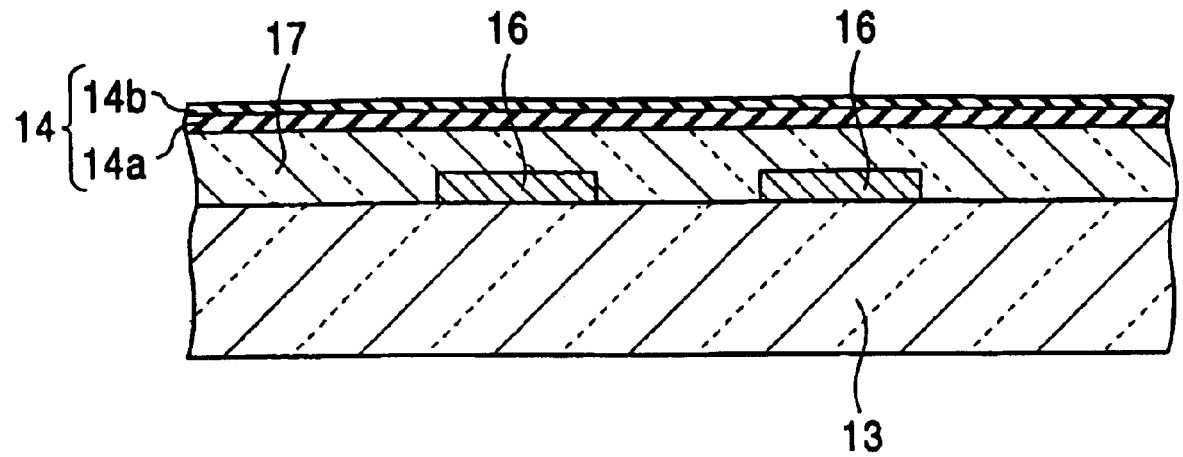
FIG. 1 is a sectional view showing a front substrate on which a protecting film in accordance with a first embodiment of the present invention is formed.
Figure 2:
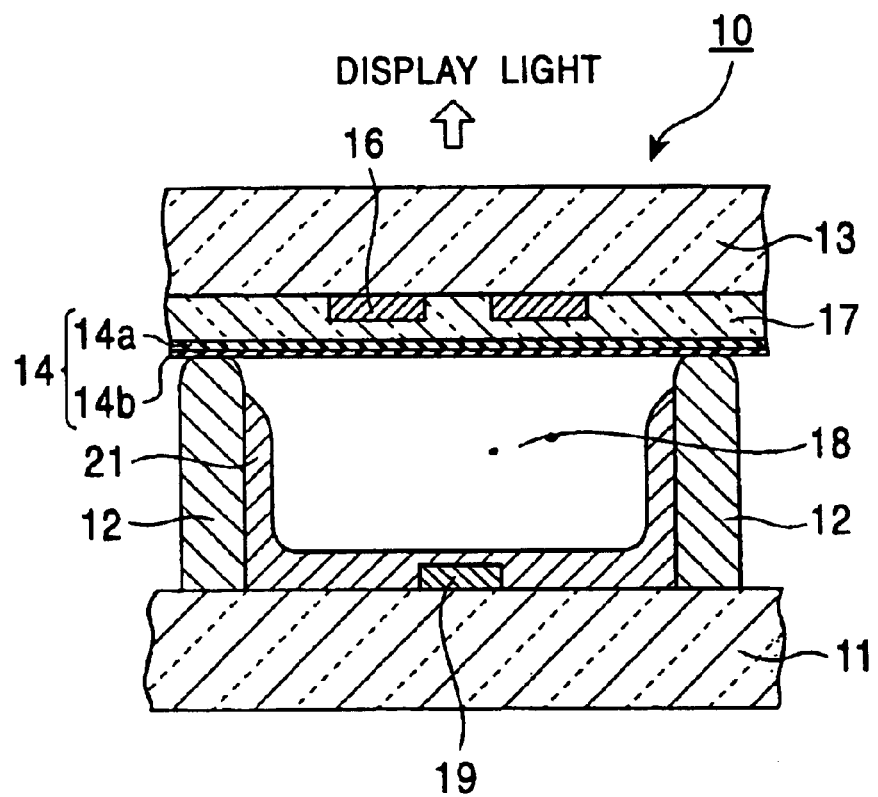
FIG. 2 is a sectional view showing a principal portion of PDP in which the front substrate shown in FIG. 1 is incorporated.

As shown in FIGS. 1 and 2, AC-type PDP 10 comprises a back glass substrate 11, and a front glass substrate 13 which are combined with partition walls 12 formed at predetermined intervals therebetween. A film body 14a is formed on the side of the front glass substrate 13 having display electrodes 16 and a transparent dielectric layer 17, a fluoride layer 14b being formed on the surface of the film body 14a, which faces the back glass substrate 11. In the PDP 10, many discharge cells 18 are compartmented by the back glass substrate 11, the front substrate 13, and the partition walls 12, and an address electrode 19 is formed on the back glass substrate 11 in each of the discharge cells 18 so as to be opposed to the display electrodes 16. In each of the discharge cells 18, a fluorescent layer 21 is formed in a region ranging from the sides of the partition walls 12 to the upper surface of the back glass substrate 11. Furthermore, a discharge gas (not shown) is injected into each of the discharge cells 18.

The above fluoride layer 14b is represented by $MO_XF_Y$ (wherein M is Mg, Ca, Sr, Ba, an alkali earth complex metal, a rare earth metal, or a complex metal of an alkali earth metal and a rare earth metal, $0 \leq X < 2$, and $0 < Y \leq 4$). For example, the fluoride layer 14b comprises a $MF_2$ layer, a $MO_{0.5}F$ layer, a $MO_{0.25}F_{1.5}$ layer, a $MF_4$ layer, a $MOF_2$ layer, a $MF_3$ layer, a MOF layer, a $MF_{2.66}$ layer or a $MOF_{0.66}$ layer, or the like. The fluoride layer 14b can be obtained by reaction of a gaseous fluorinating agent and any one of MgO, CaO, SrO, BaO, alkali earth compound oxides, rare earth oxides, and compound oxides of alkali earth oxides and rare earth oxides, which forms the film body 14a. As the gaseous fluorinating agent, any one of fluorine gas, hydrogen fluoride gas, $BF_3$, $SbF_5$ and $SF_4$, particularly, fluorine gas or hydrogen fluoride gas, is preferably used. The thickness of the fluoride layer 14b is determined by a balance between improvement in inhibition of reaction of MgO or the like and $CO_2$ gas and $H_2O$ gas, and the time of reaction of MgO or the like and the gaseous fluorinating agent. The thickness of the fluoride layer 14b is preferably in the range of 0.1 to 1000 nm, more preferably 0.1 to 100 nm. The reason for limiting the thickness of the fluoride layer 14b in the range of 0.1 to 1000 nm is that with a thickness of over 1000 nm, the time of reaction of MgO or the like and the gaseous fluorinating agent is increased to deteriorate workability.

The method of producing the PDP protecting film constructed as described above will be described.

[1] Formation of Film Body by Evaporation

First, as shown in FIG. 1, electrode paste for the display electrodes 16 composed of Ag or Au is coated on the surface of the front glass substrate 13 at predetermined intervals by screen printing, dried, and then burned. Then, transparent glass paste for the transparent dielectric layer 17 is coated over the entire surface of the front glass substrate 13 by screen printing, followed by drying. The front glass substrate 13 is dried by maintaining in air at 100 to 200° C. for 10 to 60 minutes, and then burned by maintaining in air at 500 to 600° C. for 10 to 60 minutes.

Next, sintered pellets of any one of MgO, CaO, SrO, BaO, alkali earth compound oxides, rare earth oxides, and compound oxides of alkali earth oxides and rare earth oxides, which have a purity of 99.5% or more, are deposited by evaporation such as electron beam evaporation or the like to cover the surface of the transparent dielectric layer 17 of the glass substrate 13, to form the film body 14a. Deposition conditions of the film body 14a preferably include an acceleration voltage of 5 to 30 kV, a deposition pressure of $0.1 \times 10^{-2}$ to $10 \times 10^{-2}$ Pa, and a deposition distance of 100 to 1000 nm. The front glass substrate 13 is further maintained in an atmosphere of a gaseous fluorinating agent (temperature 10 to 100° C.) for 0.1 to 120 minutes to modify the surface of the film body 14a, to form the fluoride layer 14b on the surface of the film body 14a. As the gaseous fluorinating agent, any one of fluorine gas, hydrogen fluoride gas, $BF_3$, $SbF_5$ and $SF_4$, particularly, fluorine gas or hydrogen fluoride gas, is preferably used. The pressure of the gaseous fluorinating agent is preferably set in the range of 1 to 760 Torr, more preferably in the range of 10 to 300 Torr. The reason for limiting the pressure of the gaseous fluorinating agent in the range of 1 to 760 Torr is that control of the extent of reaction, i.e., control of the thickness of the fluoride layer, is facilitated.

[2] Formation of Film Body by Sputtering

First, a glass substrate with electrodes is produced by the same method as described above in [1], and then a film body is formed on the glass substrate by sputtering using a target composed of any one of MgO, CaO, SrO, BaO, alkali earth compound oxides, rare earth oxides, and compound oxides of alkali earth oxides and rare earth oxides, which have a purity of 99.5% or more, to cover the surface of the transparent dielectric layer. The deposition conditions of the film body preferably include a redio-frequency output of 1 kW, a sputtering pressure of 0.50 to 3.0 Pa, an oxygen concentration of 5 to 50% based on argon gas, and a substrate temperature of 20 to 300° C.

Then, the film body is maintained in an atmosphere of a gaseous fluorinating agent to modify the surface thereof by the same method as described above in [1], to form a fluoride layer on the surface of the film body.

[3] Formation of Film Body by Screen Printing

A powder of any one of Mgo, CaO, SrO, BaO, alkali earth compound oxides, rare earth oxide, and compound oxides of alkali earth oxides and rare-earth oxides, which has an average particle size of 50 to 2000 Å, is previously prepared. First, electrode paste for display electrodes composed of Ag or Au is coated on the surface of a front glass substrate at predetermined intervals by screen printing, dried, and then burned. Then, transparent glass paste for a transparent dielectric layer is coated over the entire surface of the front glass substrate by screen printing, followed by drying. Then, the powder of any one of MgO, CaO, SrO, BaO, alkali earth compound oxides, rare earth oxides, and compound oxides of alkali earth oxides and rare earth oxides, which constitutes a film body, a binder, and a solvent are mixed at predetermined ratios to prepare paste for a film. The thus-prepared paste is coated over the entire surface of the transparent dielectric layer by screen printing, and dried.

As the binder, alkoxide of an alkali earth metal or rare earth metal, an organic acid compound, acetylacetonate (for example, organic acid magnesium, magnesium alkoxide, or magnesium acetylacetonate), ethyl cellulose, or ethyl silicate can be used. As the solvent, α-terpineol, butyl carbitol, butyl carbitol acetate, turpentine oil, or the like can be used. The mixing ratios of the powder of any one of MgO, CaO, SrO, BaO, alkali earth compound oxides, rare earth oxides, and compound oxides of alkali earth oxides and rare earth oxides, the binder, and the solvent are preferably set to 0 to 10% by weight, 10 to 100% by weight, and 0 to 30% by weight, respectively.

The front glass substrate is dried by maintaining in air at 100 to 200° C. for 10 to 60 minutes, and then burned by maintaining in air at 500 to 600° C. for 10 to 60 minutes. The front glass substrate is further maintained in an atmosphere of a gaseous fluorinating agent in the same manner as described above in [1] to modify the surface of the film body, to form a fluoride layer on the surface of the film body.

[4] Formation of Film Body by Spin Coating

Electrode paste and dielectric layer paste are coated o the surface of a front glass, dried and then burned by the same method as described above in [3]. Then, a powder of any one of MgO, CaO, SrO, BaO, alkali earth compound oxides, rare earth oxides, and compound oxides of alkali earth oxides and rare earth oxides, which constitutes the film body, a binder, and a solvent are mixed at predetermined ratios to prepare a dispersion for a film. The thus-prepared dispersion is deposited over the entire surface of the transparent dielectric layer by spin coating, and dried. As the binder, alkoxide of an alkali earth metal or rare earth metal, an organic acid compound, acetylacetonate (for example, magnesium alkoxide, organic acid magnesium, or magnesium acetylacetonate), ethyl silicate, or the like can be used. As the solvent, an alcohol, cellosolve, or the like can be used. The mixing ratios of the powder of any one of MgO, CaO, SrO, BaO, alkali earth compound oxides, rare earth oxides, and compound oxides of alkali earth oxides and rare earth oxides, the binder, and the solvent are preferably set to 0 to 40% by weight, 0.1 to 10% by weight, and 55 to 99.9% by weight, respectively. The front glass substrate is dried by maintaining in air at 40 to 100° C. for 5 to 60 minutes, and then burned by maintaining in air at 500 to 600° C. for 10 to 60 minutes. The front glass substrate is further maintained in an atmosphere of a gaseous fluorinating agent in the same manner as described above in [1] to modify the surface of the film body, to form a fluoride layer on the surface of the film body.

Since the PDP protecting film produced by the above-described method comprises the film body 14a having the surface coated with the fluoride layer 14b, MgO or the like in the film body 14a little reacts with $CO_2$ gas and $H_2O$ gas in air even when the protecting film 14 is exposed to air for a long time during the process for manufacturing the PDP 10. As a result, MgO or the like in the film body 14a is little degenerated to $MgCO_3$, $Mg(OH)_2$, etc. which have the probability of deteriorating the function of the PDP 10, thereby improving the environment resistance of the film body 14a.

Furthermore, MgO or the like in the film body 14a is little degenerated to $MgCO_3$ and $Mg(OH)_2$, thereby shortening the time of the subsequent degassing step for removing $MgCO_3$ and $Mg(OH)_2$ or omitting the subsequent degassing step to decrease the manufacturing cost of the PDP 10.

Since the film body 14a having substantially the same thermal expansion coefficient as the dielectric layer 17 of the protecting film 14 is bonded to the transparent dielectric layer 17, the protecting film 14 is not separated from the transparent dielectric layer 17 due to a thermal cycle, thereby significantly improving adhesion and matching to the dielectric layer 17 of the protecting film 14.

In the process for forming the protecting film 14 described above in [11 and [2], the following processing [a]or [b] is preferably carried out.

[a] The film body 14a is formed on the surface of the glass substrate 13 in a vacuum, and the surface of the film body 14a is treated with the gaseous fluorinating agent in a vacuum or an inert gas atmosphere without exposure to air to form the fluoride layer 14b on the surface of the film body 14a. The inert gas atmosphere is preferably an atmosphere of argon gas or $N_2$ gas, and preferably has a purity of 4N (99.99%), and a dew point of −650° C. or less, and $CO_2$ and CO concentrations of 5.0 ppm by volume or less.

Such treatment can prevent or suppress the formation of carbonate ($MgCO_3$ or the like) and hydroxide ($Mg(OH)_2$ or the like) of MgO or the like, which are harmful to FPD, on the surface of the film body 14a because the film body 14a is not exposed to air before the fluoride layer 14b is formed on the surface of the film body 14a formed on the surface of the substrate 13.

[b] The film body 14a is formed on the surface of the substrate 13 in a vacuum, and burned in air to be activated after it is exposed to air, and the surface thereof is further treated with the gaseous fluorinating agent to form the fluoride layer 14b on the surface of the film body 14a. The burning temperature of the film body 14a in air is 250 to 550° C., preferably 350 to 450° C., and the burning time is 0.1 to 24 hours, preferably 0.2 to 1 hour. The film body 14a is activated by burning at a temperature for a time in the above ranges. The air has an atmospheric pressure $P_t$ of 0.1 atm$\leq P_t \leq$5 5.0 atm (preferably 1.0 atm), and the following $N_2$, $O_2$, $H_2O$ and $CO_z$ contents $V_{N2}$, $V_{N2}$, $V_{H2O}$, and $V_{CO_z}$.

65% by volume$\leq V_{N2} \leq$5.0% by volume (preferably 78.1% by volume)

10% by volume $\leq V_{O_2} \leq$ 30% by volume (preferably 21.0% by volume)

0% by volume $\leq V_{H_2O} \leq$ 5% by volume (preferably 2.5% by volume)

0% by volume $\leq V_{CO_2} \leq$ 0.1% by volume (preferably 0.03% by volume)

However, z is 1 or 2, and air sometimes contains 0.1% by volume or less of other impurity gases (hydrocarbon and the like).

In such treatment, the film body 14a is burned in air to be activated, and even when carbonate ($MgCO_3$ or the like) and hydroxide ($Mg(OH)_2$ or the like) of MgO or the like, which are harmful to FPD, are formed on the surface of the film body 14a, the carbonate ($MgCO_3$ or the like) and hydroxide ($Mg(OH)_2$ or the like) of MgO or the like on the surface of the film body 14a are removed as $CO_2$ and $H_2O$. In this state, the fluoride layer 14b is formed on the surface of the film body 14a to protect the surface of the film body 14a by the fluoride layer 14b, thereby preventing or suppressing the formation of the carbonate ($MgCO_3$ or the like) and hydroxide ($Mg(OH)_2$ or the like) of MgO or the like.

In the above processing [a] and [b], burning is preferably carried out in air to activate the film body 14a before, during or after assembly of a panel using the substrate 13 on the surface of which the film body 14a and the fluoride layer 14b are formed. The burning temperature and air for burning in air are the same as described above in [b].

Since the film body 14a is activated by this burning, even when hydroxide ($Mg(OH)_2$ or the like) of MgO or the like are formed a little on the film body 14a, the hydroxide ($Mg(OH)_2$ or the like) is removed as $H_2O$, decreasing the rate of recontamination of the film body 14a with atmospheric moisture.

Figure 3:
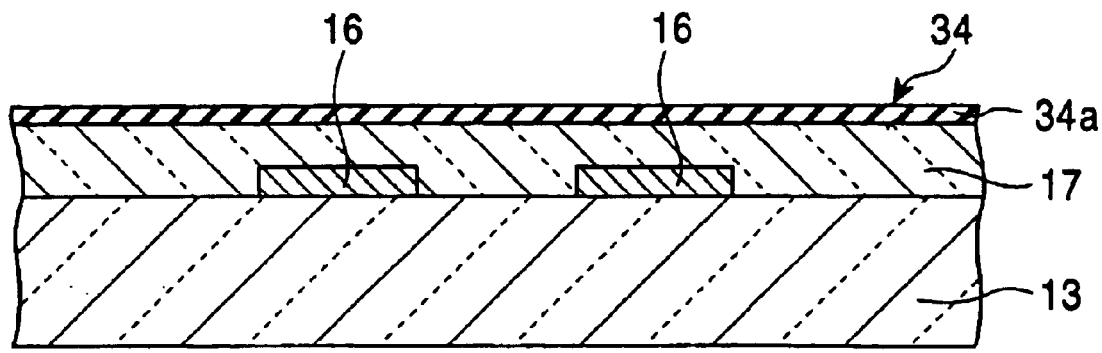
FIG. 3 is a sectional view showing a front substrate on which a protecting film in accordance with a second embodiment of the present invention is formed.
Figure 4:
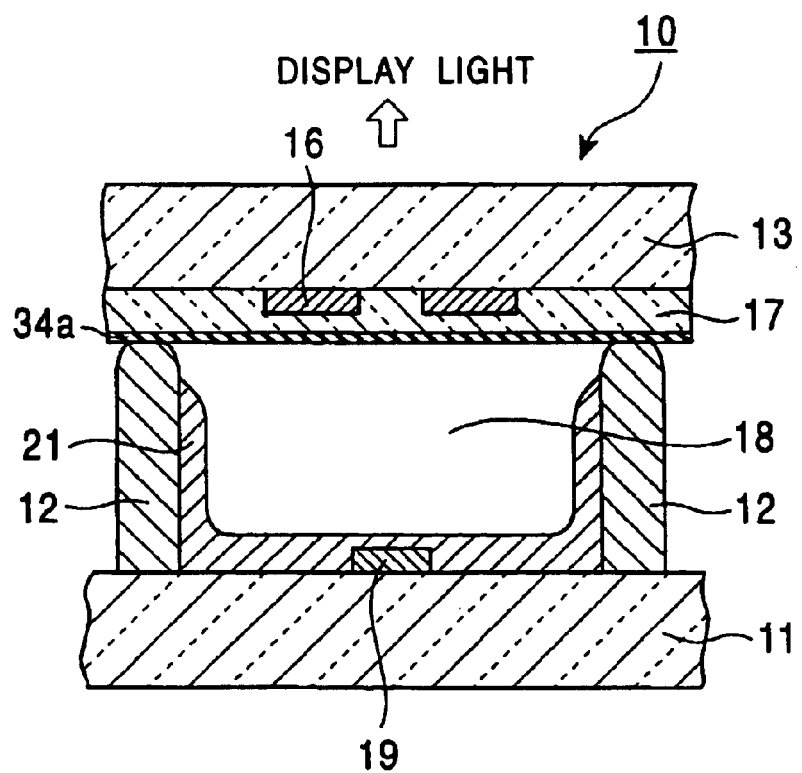
FIG. 4 is a sectional view showing a principal portion of PDP in which the front substrate shown in FIG. 3 is incorporated.

FIGS. 3 and 4 show a second embodiment of the present invention. In FIGS. 3 and 4, the same reference numerals as in FIGS. 1 and 2 denote the same components.

In this embodiment, a film body 34a constituting a protecting film 34 is formed on the surface of the front glass substrate 13 with the display electrodes 16 and the transparent dielectric layer 17 formed therebetween. The film body 34a is formed by using a fluoride layer-coated powder of any one of MgO, CaO, SrO, BaO, alkali earth compound oxides, rare earth oxides, and compound oxides of alkali earth oxides and rare earth oxides. Like in the first embodiment, the fluoride layer is represented by $MO_XF_Y$ (M is Mg, Ca, Sr, Ba, an alkali earth complex metal, a rare earth metal, or a complex metal of an alkali earth metal and a rare earth metal, $0 \leq X < 2$, and $0 < Y \leq 4$.) For example, the fluoride layer comprises a $MF_2$ layer, a $MO_{0.5}F$ layer, a $MO_{0.25}F_{1.5}$ layer, a $MF_4$ layer, a $MOF_2$ layer, a $MF_3$ layer, a MOF layer, a $MF_{2.66}$ layer or a $MOF_{0.66}$ layer, or the like. The fluoride layer 14b can be obtained by reaction of a gaseous fluorinating agent with MgO, or the like. As the gaseous fluorinating agent, any one of fluorine gas, hydrogen fluoride gas, $BF_3$, $SbF_5$ and $SF_4$, particularly, fluorine gas or hydrogen fluoride gas, is preferably used. The thickness of the fluoride layer is determined by a balance between improvement in inhibition of reaction of MgO or the like and $CO_2$ gas and $H_2O$ gas, and the time of reaction of MgO or the like and the gaseous fluorinating agent. The thickness of the fluoride layer 14b is preferably in the range of 0.1 to 1000 nm, more preferably 0.1 to 100 nm. The reason for limiting the thickness of the fluoride layer in the range of 0.1 to 1000 nm is that with a thickness of over 1000 nm, the time of reaction of MgO or the like and the gaseous fluorinating agent is increased to deteriorate workability. The other construction is the same as the first embodiment.

The method of producing the PDP protecting film having the above construction will be described.

[1] Formation of Film Body by Screen Printing

First, a powder of any one of MgO, CaO, SrO, BaO, alkali earth compound oxides, rare earth oxides, and compound oxides of alkali earth oxides and rare earth oxides, which has an average particle size of 50 to 2000 Å, is prepared. Next, the MgO powder or the like is maintained in an atmosphere of a gaseous fluorinating agent (temperature 10 to 100° C.) for 0.1 to 120 minutes to modify the surfaces of the MgO powder or the like, to form fluoride layers on the surfaces of the MgO powder or the like. As the gaseous fluorinating agent, any one of fluorine gas, hydrogen fluoride gas, $BF_3$, $SbF_5$ and $SF_4$, particularly, fluorine gas or hydrogen fluoride gas, is preferably used. The pressure of the gaseous fluorinating agent is preferably set in the range of 1 to 760 Torr, more preferably 10 to 300 Torr. The reason for limiting the pressure of the gaseous fluorinating agent in the range of 1 to 760 Torr is that control of the extent of reaction, i.e., the thickness of the fluoride layer, is facilitated.

Next, as shown in FIG. 3, electrode paste for the display electrodes 16 composed of Ag or Au is coated on the surface of the front glass substrate 13 at predetermined intervals by screen printing, dried, and then burned. Then, transparent glass paste for the transparent dielectric layer 17 is coated over the entire surface of the front glass substrate 13 by screen printing, followed by drying. Then, the MgO powder or the like (having the surfaces coated with the fluoride layers), which constitutes the film body 34a, a binder, and a solvent are mixed at predetermined ratios to prepare paste for a film. The thus-prepared paste is coated over the entire surface of the transparent dielectric layer 17 by screen printing, and dried. As the binder, alkoxide of an alkali earth metal or rare earth metal, an organic acid compound, acetylacetonate (for example, organic acid magnesium, magnesium alkoxide, or magnesium acetylacetonate), ethyl cellulose, or ethyl silicate can be used. As the solvent, α-terpineol, butyl carbitol, butyl carbitol acetate, turpentine oil, or the like can be used. The mixing ratios of the MgO powder or the like, the binder, and the solvent are preferably set to 0.1 to 10% by weight, 10 to 99.9% by weight, and 0 to 30% by weight, respectively. Furthermore, the front glass substrate 13 is dried by maintaining in air at 100 to 200° C. for 10 to 60 minutes, and then burned by maintaining in air at 500 to 600° C. for 10 to 60 minutes in air.

[2] Formation of Film Body by Spin Coating

First, the surfaces of a powder of any one of MgO, CaO, SrO, BaO, alkali earth compound oxides, rare earth oxides, and compound oxides of alkali earth oxides and rare earth oxides are coated with fluoride layers in the same manner as described above in [1]. Next, electrode paste and dielectric layer paste are coated on the surface of the front glass substrate, dried and burned. Then, the MgO powder or the like (having the surfaces coated with the fluoride layers), which constitutes the film body, a binder, and a solvent are mixed at predetermined ratios to prepare a dispersion for a film. The thus-prepared dispersion is coated over the entire surface of the transparent dielectric layer by spin coating, and dried. As the binder, alkoxide of an alkali earth metal or rare earth metal, an organic acid compound, acetylacetonate (for example, magnesium alkoxide, organic acid magnesium, magnesium acetylacetonate, magnesium trifluoroacetate, magnesium trifluoroacetylacetonate, or magnesium hexafluoroacetylacetonate), ethyl silicate, or the like can be used. As the solvent, an alcohol, cellosolve, or the like can be used. The mixing ratios of the MgO powder or the like, the binder, and the solvent are preferably set to 1 to 40% by weight, 0.1 to 10% by weight, and 55 to 98.9% by weight, respectively. Furthermore, the front glass substrate is dried by maintaining in air at 40 to 100° C. for 5 to 60 minutes, and then burned by maintaining in air at 500 to 600° C. for 10 to 60 minutes.

Since the PDP protecting film produced by the above-described method comprises the film body 34a composed of the MgO powder or the like, the surfaces of which are coated with the fluoride layers, MgO or the like in the film body 34a little reacts with CO, gas and $H_2O$ gas in air even when the film body 34a is exposed to air for a long time during the process for manufacturing the PDP 10. As a result, the MgO powder or the like in the film body 34a is little degenerated to $MgCO_3$, $Mg(OH)_2$, etc. which have the probability of deteriorating the function of the PDP 10, thereby improving the environment resistance of the film body 34a.

Furthermore, the MgO powder or the like in the film body 34a is little degenerated to $MgCO_3$ and $Mg(OH)_2$, thereby shortening the time of the subsequent degassing step for removing $MgCO_3$ and $Mg(OH)_2$ or omitting the subsequent degassing step to decrease the manufacturing cost of the PDP 10.

Furthermore, the fluoride layers coated on the surfaces of the MgO powder or the like are very thin, and thus the MgO powder or the like has substantially the same mechanical properties as a MgO powder or the like without the fluoride layer.

Figure 5:
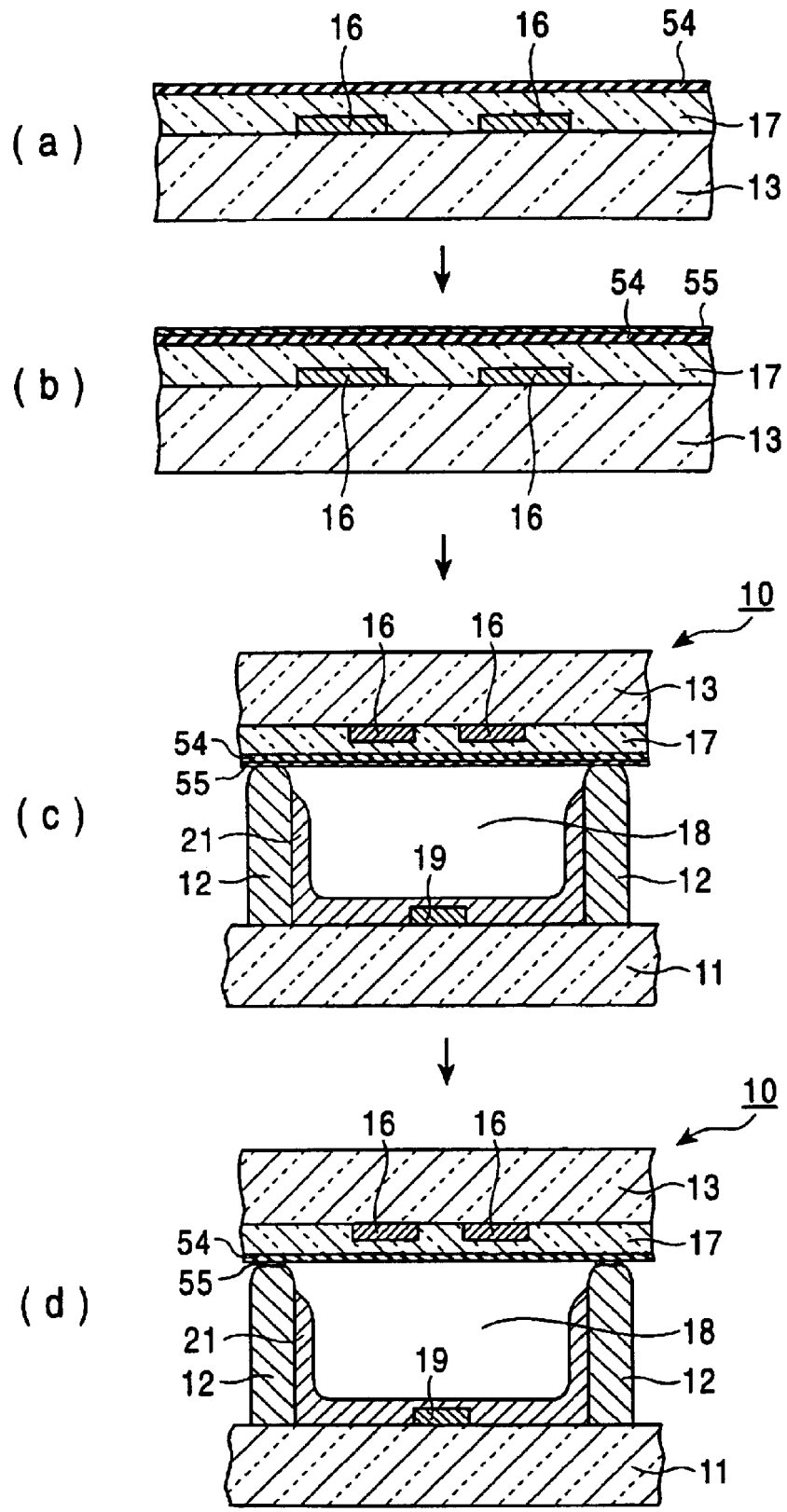
FIG. 5 is a drawing showing the steps of a process for manufacturing PDP using a protecting film in accordance with a third embodiment of the present invention.

FIG. 5 shows a third embodiment of the present invention. In FIG. 5, the same reference numerals as FIGS. 1 and 2 denote the same components.

In this embodiment, a protecting film 54 is composed of an alkali earth metal oxide, an alkali earth metal compound oxide, a rare earth metal oxide, or a compound oxide of an alkali earth metal and rare earth metal. Examples of alkali earth metal oxides include MgO, CaO, SrO, and BaO; and examples of alkali earth metal compound oxides include (Ca, Sr)O, (Mg, Sr)O, and (Sr, Ba)O. Examples of rare earth metal oxides include $Y_2O_3$, $Gd_2O_3$, $Dy_2O_3$, $Yb_2O_3$, $Nd_2O_3$, $Ho_2O_3$, $Er_2O_3$, $La_2O_3$, $Sc_2O_3$, $CeO_2$, $Pr_6O_{11}$, $Sm_2O_3$, $Eu_2O_3$, $Tb_4O_7$, $Tm_2O_3$, and $Lu_2O_3$. Examples of compound oxides of alkali earth metals and rare earth metals include $MRe_2O_4$ (M is an alkali earth metal such as Mg, Ca, Sr or Ba, and Re is a rare earth metal such as Gd, Y or La), alkali earth metal oxide mixtures containing several molar % of rare earth metal compound [$MO:Re_2O_3$ (for example, $MgO:La_2O_3$, $MgO:Sc_2O_3$, $MgO:Y_2O_3$, and the like)], and the like.

A fluoride layer 55 is formed on the surface of the protecting film 54. The fluoride layer 55 is removed after PDP is assembled by using the protecting film 54 on which the fluoride layer 55 is formed. The fluoride layer 55 is represented by $MO_XF_Y$ (wherein M is an alkali earth metal, an alkali earth complex metal, a rare earth metal, or a complex metal of an alkali earth metal and a rare earth metal, $0 \leq X < 2$, and $0 < Y \leq 4$). Examples of alkali earth metals include Mg, Ca, Sr, and Ba: and examples of alkali earth complex metals include (Ca, Sr), (Mg, Sr), and (Sr, Ba). Examples of rare earth metals include Y, Gd, Dy, Yb, Nd, Ho, Er, La, Sc, Ce, Pr, Sm, Eu, Tb, Tm, and Lu. Examples of compounds of alkali earth metals and rare earth metals include MRe (M is an alkali earth metal such as Mg, Ca, Sr or Ba, and Re is a rare earth metal such as Gd, Y or La), alkali earth metal mixtures containing several molar % of rare earth metal [MO:Re (for example, Mg:La, Mg:Sc, Mg:Y, and the like)], and the like.

Examples of the fluoride layer include a $MF_2$ layer, a $MO_{0.5}F$ layer, a $MO_{0.25}F_{1.5}$ layer, a $MF_4$ layer, a $MOF_2$ layer, a $MF_3$ layer, a MOF layer, a $MF_{2.66}$ layer and a $MOF_{0.66}$ layer. The fluoride layer 55 can be obtained by reaction of a gaseous fluorinating agent and MgO which forms the protecting film 34. As the gaseous fluorinating agent, any one of fluorine gas, hydrogen fluoride gas, $BF_3$, $SbF_5$ and $SF_4$, particularly, fluorine gas or hydrogen fluoride gas, is preferably used from the viewpoint of the degree of reactivity and versatility of the gaseous fluorinating agent. The thickness of the fluoride layer 55 is determined by a balance between improvement in inhibition of reaction of a alkali earth metal oxide or the like and $CO_2$ gas and water vapor, and the time of reaction of an alkali earth metal oxide or the like and the gaseous fluorinating agent. The thickness of the fluoride layer 55 is preferably in the range of 0.1 to 1000 nm, more preferably 0.1 to 100 nm. The reason for limiting the thickness of the fluoride layer 55 in the range of 0.1 to 1000 nm is that with a thickness of over 1000 nm, the time of reaction of a alkali earth metal oxide or the like and the gaseous fluorinating agent is increased to deteriorate workability.

The method of producing the PDP protecting film constructed as described above will be described.

[1] Formation of Protecting Film by Evaporation

First, as shown in FIG. 5(a), electrode paste for the display electrodes 16 composed of Ag or Au is coated on the surface of the front glass substrate 13 at predetermined intervals by screen printing, dried, and then burned. Then, transparent glass paste for the transparent dielectric layer 17 is coated over the entire surface of the front glass substrate 13 by screen printing, followed by drying. The front glass substrate 13 is dried by maintaining in air at 100 to 200° C. for 10 to 60 minutes, and then burned by maintaining in air at 500 to 600° C. for 10 to 60 minutes.

Next, sintered pellets of an alkali earth metal oxide or the like (for example, MgO), which has a purity of 99.5% or more, are deposited by vaporization such as electron beam evaporation or the like to cover the surface of the transparent dielectric layer 17 of the glass substrate 13, to form the protecting film 54 (FIG. 5(a)). Deposition conditions of the protecting film 54 preferably include an acceleration voltage of 5 to 30 kV, a deposition pressure of $0.1 \times 10^{-2}$ to $10 \times 10^{-2}$ Pa, and a deposition distance of 100 to 1000 nm. The front glass substrate 13 is further maintained in an atmosphere of a gaseous fluorinating agent (temperature 10 to 100° C.) for 0.1 to 120 minutes to modify the surface of the protecting film 54, to form the fluoride, layer 55 on the surface of the protecting film 54 (FIG. 5(b). The pressure of the gaseous fluorinating agent is preferably set in the range of 1 to 760 Torr, more preferably in the range of 10 to 300 Torr. The reason for limiting the pressure of the gaseous fluorinating agent in the range of 1 to 760 Torr is that control of the extent of reaction, i.e., control of the thickness of the fluoride layer, is facilitated.

After the glass substrate 13 is incorporated in the PDP 10 (FIG. 5(c)), and a removal discharge gas is injected in each of the cells 18 of the PDP 10, a predetermined voltage is applied between the display electrodes 16 to start surface discharge so that the fluoride layer 55 is removed by etching due to the discharge (FIG. 5(d)). Furthermore, the removal discharge gas is exhausted from each of the cells 18, and then a display discharge gas is sealed in each of the cells 18. The fluoride layer 55 is preferably removed by plasma etching using a fluorine-containing gas such as $CF_6$, $SF_6$, or the like as the removal discharge gas. After removal processing of the fluoride layer 55, in some cases, the fluoride layer 55 having substantially the same area as the upper sides of the partition walls partially remains between the partition walls and the protecting film (FIG. 5(d)).

[2] Formation of Protecting Film by Sputtering

First, a glass substrate with electrodes is produced by the same method as described above in [1], and then a protecting film is formed on the glass substrate by sputtering using a MgO target having a 5-inch size and a purity of 99.5% or more to cover the surface of the transparent dielectric layer. The deposition conditions of the protecting film preferably include a radio-frequency output of 1 kW, a sputtering pressure of 0.50 to 3.0 Pa, an oxygen concentration of 5 to 50% based on argon gas, and a substrate temperature of 20 to 300° C.

Then, the protecting film is maintained in an atmosphere of the gaseous fluorinating agent to modify the surface thereof by the same method as described above in [1], to form a fluoride layer on the surface of the protecting film. Furthermore, after the glass substrate is incorporated in PDP, the fluoride layer is removed.

[3] Formation of Protecting Film by Screen Printing

A powder of an alkali earth metal oxide or the like (for example, MgO), which has an average particle size of 50 to 2000 Å, is previously prepared by a vapor phase or liquid synthetic method. First, electrode paste for the display electrodes composed of Ag or Au is coated on the surface of the front glass substrate at predetermined intervals by screen printing, dried, and then burned. Then, transparent glass paste for the transparent dielectric layer is coated over the entire surface of the front glass substrate by screen printing, followed by drying. Then, the powder which constitutes the protecting film, a binder, and a solvent are mixed at predetermined ratios to prepare paste. The thus-prepared paste is coated over the entire surface of the transparent dielectric layer by screen printing, and dried.

As the binder, organic acid magnesium, magnesium alkoxide, or magnesium acetylacetonate, ethyl cellulose, or ethyl silicate can be used. As the solvent, $\alpha$-terpineol, butyl carbitol, butyl carbitol acetate, turpentine oil, or the like can be used. The mixing ratios of the powder, the binder, and the solvent are preferably set to 0 to 10% by weight, 10 to 100% by weight, and 0 to 30% by weight, respectively.

The front glass substrate is dried by maintaining in air at 100 to 200° C. for 10 to 60 minutes, and then burned by maintaining in air at 500 to 600° C. for 10 to 60 minutes. The front glass substrate is further maintained in an atmosphere of a gaseous fluorinating agent in the same manner as described above in [1] to modify the surface of the protecting film, to form a fluoride layer on the surface of the protecting film. After the glass substrate is incorporated in PDP, the fluoride layer is removed.

[4] Formation of Protecting Film by Spin Coating

Electrode paste and dielectric layer are coated on the surface of the front glass, dried and then burned by the same method as described above in (3). Then, a powder of an alkali earth metal oxide or the like (for example, MgO), which constitutes the protecting film, a binder, and a solvent are mixed at predetermined ratios to prepare a dispersion. The thus-prepared dispersion is deposited over the entire surface of the transparent dielectric layer by spin coating, and dried. As the binder, magnesium alkoxide, an organic acid compound, acetylacetonate, ethyl silicate, or the like can be used. As the solvent, an alcohol, cellosolve, or the like can be used. The mixing ratios of the MgO powder, the binder, and the solvent are preferably set to 0 to 40% by weight, 0.1 to 10% by weight, and 55 to 99.9% by weight, respectively. The front glass substrate is dried by maintaining in air at 40 to 100° C. for 5 to 60 minutes, and then burned by maintaining in air at 500 to 600° C. for 10 to 60 minutes. The front glass substrate is further maintained in an atmosphere of a gaseous fluorinating agent in the same manner as described above in [1] to modify the surface of the protecting film, to form a fluoride layer on the surface of the protecting film. After the glass substrate is incorporated in PDP, the fluoride layer is removed.

Since the PDP protecting film produced by the above-described method has the surface coated with the fluoride layer 55, the protecting film 54 little reacts with $CO_2$ gas and $H_2O$ gas in air even when the protecting film 54 is exposed to air for a long time during the process for manufacturing the PDP 10. As a result, the protecting film 54 is little degenerated to $MgCO_3$, $Mg(OH)_2$, etc. which have the probability of deteriorating the function of the PDP 10, thereby improving the environment resistance of the protecting film 54.

In addition, since the fluoride layer 55 is formed by direct reaction between the protecting film 54 and the gaseous fluorinating agent, the fluoride layer 55 and the protecting film 54 have good matching therebetween. Therefore, it is possible to prevent the occurrence of cracking in the fluoride layer 55, and separation of the fluoride layer 55, and improve the degeneration protecting effect of the protecting film 54.

Furthermore, since the fluoride layer 55 is removed after the glass substrate 13 produced by the above-described method is incorporated in the PDP 10, discharge characteristics of the PDP 10 can be improved.

Although the first to third embodiments relate to PDP as FPD, PALC or the like may be used as long as a protecting film is formed on the surface of a front glass substrate.

Examples and comparative examples of the present invention will be described in detail below.

EXAMPLE 1

First, display electrodes (thickness of 5 $\mu$m) made of Ag were formed on a front glass substrate having a thickness of 3 mm by screen printing, and then a transparent dielectric layer (thickness of 20 $\mu$m) made of glass was formed thereon by screen printing, as shown in FIG. 1. Next, the glass substrate was dried by maintaining in air at 150° C. for 30 minutes, and then burned by maintaining in air at 550° C. for 30 minutes.

Next, using MgO sintered pellets having a purity of 99.8%, MgO films were deposited by electron beam evaporation to cover the surface of the transparent dielectric layer of the glass substrate to form a film body. The deposition conditions for the film body included an acceleration voltage of 15 kV, a deposition pressure of $1\times10^{-2}$ Pa, a deposition distance of 600 mm. The glass substrate was further maintained in a $F_2$ gas atmosphere (temperature 25° C.) at pressure of 152 Torr for 10 minutes to modify the surface of the film body, to form the fluoride layer on the surface of the film body. The thus-formed glass substrate was referred to as "EXAMPLE 1".

EXAMPLE 2

A film body was formed on the surface of a glass substrate by electron beam evaporation in the same manner as Example 1, and then the glass substrate was maintained in a $F_2$ gas atmosphere (temperature 25° C.) at pressure of 72 Torr for 10 minutes to modify the surface of the film body, to form a fluoride layer on the surface of the film body. The thus-formed glass substrate was referred to as "Example 2".

EXAMPLE 3

A film body was formed on the surface of a glass substrate by electron beam evaporation in the same manner as Example 1, and then the glass substrate was maintained in a $F_2$ gas atmosphere (temperature 25° C.) at pressure of 38 Torr for 1 minute to modify the surface of the film body, to form a fluoride layer on the surface of the film body. The thus-formed glass substrate was referred to as "Example 3".

EXAMPLE 4

A film body was formed on the surface of a glass substrate by electron beam evaporation in the same manner as Example 1, and then the glass substrate was maintained in a $F_2$ gas atmosphere (temperature 25° C.) at pressure of 38 Torr for 10 minutes to modify the surface of the film body, to form a fluoride layer on the surface of the film body. The thus-formed glass substrate was referred to as "Example 4".

EXAMPLE 5

A film body was formed on the surface of a glass substrate by electron beam evaporation in the same manner as Example 1, and then the glass substrate was maintained in a $F_2$ gas atmosphere (temperature 25° C.) at pressure of 38 Torr for 60 minutes to modify the surface of the film body, to form a fluoride layer on the surface of the film body. The thus-formed glass substrate was referred to as "Example 5".

EXAMPLE 6

A film body was formed on the surface of a glass substrate by electron beam evaporation in the same manner as Example 1, and then the glass substrate was maintained in a $F_2$ gas atmosphere (temperature 25° C.) at pressure of 7.6 Torr for 10 minutes to modify the surface of the film body, to form a fluoride layer on the surface of the film body. The thus-formed glass substrate was referred to as "Example 6".

EXAMPLE 7

A film body was formed on the surface of a glass substrate by electron beam evaporation by the same manner as Example 1, and then the glass substrate was maintained in an atmosphere (temperature 25° C.) a gas mixture containing $F_2$ gas at partial pressure of 7.6 Torr and $N_2$ gas at partial pressure of 752 Torr for 10 minutes to modify the surface of the film body, to form a fluoride layer on the surface of the film body. The thus-formed glass substrate was referred to as "Example 7".

EXAMPLE 8

A film body was formed on the surface of a glass substrate by electron beam evaporation in the same manner as Example 1, and then the glass substrate was maintained in a $F_2$ gas atmosphere (temperature 100° C.) at pressure of 7.6 Torr for 10 minutes to modify the surface of the film body, to form a fluoride layer on the surface of the film body. The thus-formed glass substrate was referred to as "Example 8".

EXAMPLE 9

A film body was formed on the surface of a glass substrate by electron beam evaporation in the same manner as Example 1, and then the glass substrate was maintained in a HF gas atmosphere (temperature 25° C.) at pressure of 38 Torr for 1 minute to modify the surface of the film body, to form a fluoride layer on the surface of the film body. The thus-formed glass substrate was referred to as "Example 9".

EXAMPLE 10

A film body was formed on the surface of a glass substrate by electron beam evaporation in the same manner as Example 1, and then the glass substrate was maintained in an atmosphere (temperature 25° C.) of a gas mixture containing HF gas at partial pressure of 7.6 Torr and $N_2$ gas at partial pressure of 752 Torr for 10 minutes to modify the surface of the film body, to form a fluoride layer on the surface of the film body. The thus-formed glass substrate was referred to as "Example 10".

EXAMPLE 11

A film body was formed on the surface of a glass substrate by electron beam evaporation in the same manner as Example 1, and then the glass substrate was maintained in a $BF_3$ gas atmosphere (temperature 25° C.) at pressure of 7.6 Torr for 10 minutes to modify the surface of the film body, to form a fluoride layer on the surface of the film body. The thus-formed glass substrate was referred to as "Example 11".

EXAMPLE 12

A film body was formed on the surface of a glass substrate by electron beam evaporation in the same manner as Example 1, and then the glass substrate was maintained in a $SbF_5$ gas atmosphere (temperature 25° C.) at pressure of 7.6 Torr for 10 minutes to modify the surface of the film body, to form a fluoride layer on the surface of the film body. The thus-formed glass substrate was referred to as "Example 12".

EXAMPLE 13

A film body was formed on the surface of a glass substrate by electron beam evaporation in the same manner as Example 1, and then the glass substrate was maintained in a SF, gas atmosphere (temperature 25° C.) at pressure of 7.6 Torr for 10 minutes to modify the surface of the film body, to form a fluoride layer on the surface of the film body. The thus-formed glass substrate was referred to as "Example 13".

EXAMPLE 14

A glass substrate with electrodes was formed by the same method as Example 1, and then a transparent dielectric film was coated on the glass substrate by sputtering using a 5-inch size MgO target having a purity of 99.99% (4N) to form a film body. The deposition conditions for the film body preferably included a radio-frequency output of 1 kW, a sputtering pressure of 1.33 Pa, an oxygen concentration of 10% relative to argon gas, and a substrate temperature of 150° C.

The glass substrate was maintained in a $F_2$ gas atmosphere by the same method as Example 1 to modify the surface of the film body, to form a fluoride layer on the surface of the film body. The thus-formed glass substrate was referred to as "Example 14".

EXAMPLE 15

A film body was formed on the surface of a glass substrate by sputtering in the same manner as Example 14, and then the glass substrate was maintained in a $F_2$ gas atmosphere (temperature 25° C.) at pressure of 72 Torr for 10 minutes to modify the surface of the film body, to form a fluoride layer on the surface of the film body. The thus-formed glass substrate was referred to as "Example 15".

EXAMPLE 16

A film body was formed on the surface of a glass substrate by sputtering in the same manner as Example 14, and then the glass substrate was maintained in a $F_2$ gas atmosphere (temperature 25° C.) at pressure of 38 Torr for 1 minute to modify the surface of the film body, to form a fluoride layer on the surface of the film body. The thus-formed glass substrate was referred to as "Example 16".

EXAMPLE 17

A film body was formed on the surface of a glass substrate by sputtering in the same manner as Example 14, and then the glass substrate was maintained in a $F_2$ gas atmosphere (temperature 25° C.) at pressure of 38 Torr for 10 minutes to modify the surface of the film body, to form a fluoride layer on the surface of the film body. The thus-formed glass substrate was referred to as "Example 17".

EXAMPLE 18

A film body was formed on the surface of a glass substrate by sputtering in the same manner as Example 14, and then the glass substrate was maintained in a $F_2$ gas atmosphere (temperature 25° C.) at pressure of 38 Torr for 60 minutes to modify the surface of the film body, to form a fluoride layer on the surface of the film body. The thus-formed glass substrate was referred to as "Example 18".

EXAMPLE 19

A film body was formed on the surface of a glass substrate by sputtering in the same manner as Example 14, and then the glass substrate was maintained in a $F_2$ gas atmosphere (temperature 25° C.) at pressure of 7.6 Torr for 10 minutes to modify the surface of the film body, to form a fluoride layer on the surface of the film body. The thus-formed glass substrate was referred to as "Example 19".

EXAMPLE 20

A film body was formed on the surface of a glass substrate by sputtering in the same manner as Example 14, and then the glass substrate was maintained in an atmosphere (temperature 25° C.) a gas mixture containing $F_2$ gas at pressure of 7.6 Torr and N2 gas at pressure of 752 Torr for 10 minutes to modify the surface of the film body, to form a fluoride layer on the surface of the film body. The thus-formed glass substrate was referred to as "Example 20".

EXAMPLE 21

A film body was formed on the surface of a glass substrate by sputtering in the same manner as Example 14, and then the glass substrate was maintained in a $F_2$ gas atmosphere (temperature 100° C.) at pressure of 7.6 Torr for 10 minutes to modify the surface of the film body, to form a fluoride layer on the surface of the film body. The thus-formed glass substrate was referred to as "Example 21".

EXAMPLE 22

A film body was formed on the surface of a glass substrate by sputtering in the same manner as Example 14, and then the glass substrate was maintained in a HF gas atmosphere (temperature 25° C.) at pressure of 38 Torr for 1 minute to modify the surface of the film body, to form a fluoride layer on the surface of the film body. The thus-formed glass substrate was referred to as "Example 22".

EXAMPLE 23

A film body was formed on the surface of a glass substrate by sputtering in the same manner as Example 14, and then the glass substrate was maintained in an atmosphere (temperature 25° C.) of a gas mixture containing HF gas at pressure of 7.6 Torr and $N_2$ gas at pressure of 752 Torr for 10 minutes to modify the surface of the film body, to form a fluoride layer on the surface of the film body. The thus-formed glass substrate was referred to as "Example 23".

EXAMPLE 24

First, display electrodes (thickness of 5 µm) made of Ag were formed on a front glass substrate having a thickness of 3 mm by screen printing, and then a transparent dielectric layer (thickness of 20 µm) made of glass was formed thereon by screen printing. Next, 79% by weight of organic acid magnesium (Magnesium Naphthenate, produced by Nihon Kagaku Sangyo Co., Ltd.) as a binder containing a MgO component, 2% by weight of ethyl cellulose as a binder containing no MgO component, and 19% by weight of α-terpineol as a solvent were mixed to prepare paste for a film. The thus-prepared paste was coated on the glass substrate by screen printing to form a film body.

Next, the glass substrate was dried by maintaining at 150° C. in air for 30 minutes, and then burned by maintaining at 550° C. in air for 30 minutes. Furthermore, the glass substrate was maintained in a $F_2$ gas atmosphere (temperature 25° C.) at pressure of 152 Torr for 10 minutes to modify the surface of the film body, to form a fluoride layer on the surface of the film body. The thus-formed glass substrate was referred to as "Example 24".

EXAMPLE 25

A film body was formed on the surface of a glass substrate by screen printing in the same manner as Example 24, dried and then burned. Then the glass substrate was maintained in a $F_2$ gas atmosphere (temperature 25° C.) at pressure of 72 Torr for 10 minutes to modify the surface of the film body, to form a fluoride layer on the surface of the film body. The thus-formed glass substrate was referred to as "Example 25".

EXAMPLE 26

A film body was formed on the surface of a glass substrate by screen printing in the same manner as Example 24, dried and then burned. Then the glass substrate was maintained in a $F_2$ gas atmosphere (temperature 25° C.) at pressure of 38 Torr for 1 minute to modify the surface of the film body, to form a fluoride layer on the surface of the film body. The thus-formed glass substrate was referred to as "Example 26".

EXAMPLE 27

A film body was formed on the surface of a glass substrate by screen printing in the same manner as Example 24, dried and then burned. Then the glass substrate was maintained in a $F_2$ gas atmosphere (temperature 25° C.) at pressure of 38 Torr for 10 minutes to modify the surface of the film body, to form a fluoride layer on the surface of the film body. The thus-formed glass substrate was referred to as "Example 27".

EXAMPLE 28

A film body was formed on the surface of a glass substrate by screen printing in the same manner as Example 24, dried and then burned. Then the glass substrate was maintained in a $F_2$ gas atmosphere (temperature 25° C.) at pressure of 38

Torr for 60 minutes to modify the surface of the film body, to form a fluoride layer on the surface of the film body. The thus-formed glass substrate was referred to as "Example 28".

EXAMPLE 29

A film body was formed on the surface of a glass substrate by screen printing in the same manner as Example 24, dried and then burned. Then the glass substrate was maintained in a $F_2$ gas atmosphere (temperature 25° C.) at pressure of 7.6 Torr for 10 minutes to modify the surface of the film body, to form a fluoride layer on the surface of the film body. The thus-formed glass substrate was referred to as "Example 29".

EXAMPLE 30

A film body was formed on the surface of a glass substrate by screen printing in the same manner as Example 24, dried and then burned. Then the glass substrate was maintained in an atmosphere (temperature 25° C.) of a gas mixture containing $F_2$ gas at pressure of 7.6 Torr and $N_2$ gas at pressure of 752 Torr for 10 minutes to modify the surface of the film body, to form a fluoride layer on the surface of the film body. The thus-formed glass substrate was referred to as "Example 30".

EXAMPLE 31

A film body was formed on the surface of a glass substrate by screen printing in the same manner as Example 24, dried and then burned. Then the glass substrate was maintained in a $F_2$ gas atmosphere (temperature 100° C.) at pressure of 7.6 Torr for 10 minutes to modify the surface of the film body, to form a fluoride layer on the surface of the film body. The thus-formed glass substrate was referred to as "Example 31".

EXAMPLE 32

A film body was formed on the surface of a glass substrate by screen printing in the same manner as Example 24, dried and then burned. Then the glass substrate was maintained in a HF gas atmosphere (temperature 25° C.) at pressure of 38 Torr for 1 minute to modify the surface of the film body, to form a fluoride layer on the surface of the film body. The thus-formed glass substrate was referred to as "Example 32".

EXAMPLE 33

A film body was formed on the surface of a glass substrate by screen printing in the same manner as Example 24, dried and then burned. Then the glass substrate was maintained in an atmosphere (temperature 25° C.) of a gas mixture containing HF gas at pressure of 7.6 Torr and $N_2$ gas at pressure of 752 Torr for 10 minutes to modify the surface of the film body, to form a fluoride layer on the surface of the film body. The thus-formed glass substrate was referred to as "Example 33".

EXAMPLE 34

5% by weight of MgO powder (produced by Ube Materials) produced by a vapor phase method and having an average particle size of 100 Å, 79% by weight of organic acid magnesium (Magnesium Naphthenate, produced by Nihon Kagaku Sangyo Co., Ltd.) as a binder for a MgO component, 2% by weight of ethyl cellulose, and 18% by weight of α-terpineol as a solvent were mixed to prepare powder-containing paste for a film. The thus-prepared paste for a film containing a MgO powder was used for forming a film body on the glass substrate by the same method as Example 24. Next, the surface of the film body was modified to form a fluoride layer on the surface thereof. The thus-formed glass substrate was referred to as "Example 34".

EXAMPLE 35

First, the display electrodes 16 (thickness of 5 μm) made of Ag were formed on the front glass substrate 13 having a thickness of 3 mm by screen printing, and then the transparent dielectric layer 17 (thickness of 20 μm) made of glass was formed thereon by screen printing. Next, 1.25% by weight of magnesium ethoxide as a binder containing a MgO component, and 98.75% by weight of methyl cellosolve as a solvent were mixed to prepare a uniform coating solution for a film. The thus-prepared coating solution was coated on the glass substrate by spin coating to form a film body.

Next, the glass substrate 13 was dried by maintaining at 60° C. in air for 30 minutes, and then burned by maintaining at 580° C. in air for 10 minutes. Furthermore, the glass substrate was maintained in a $F_2$ gas atmosphere (temperature 25° C.) at pressure of 152 Torr for 10 minutes to modify the surface of the film body, to form a fluoride layer on the surface of the film body. The thus-formed glass substrate was referred to as "Example 35".

EXAMPLE 36

A film body was formed on the surface of a glass substrate by spin coating in the same manner as Example 35, dried and then burned. Then the glass substrate was maintained in a $F_2$ gas atmosphere (temperature 25° C.) at pressure of 72 Torr for 10 minutes to modify the surface of the film body, to form a fluoride layer on the surface of the film body. The thus-formed glass substrate was referred to as "Example 36".

EXAMPLE 37

A film body was formed on the surface of a glass substrate by spin coating in the same manner as Example 35, dried and then burned. Then the glass substrate was maintained in a $F_2$ gas atmosphere (temperature 25° C.) at pressure of 38 Torr for 1 minute to modify the surface of the film body, to form a fluoride layer on the surface of the film body. The thus-formed glass substrate was referred to as "Example 37".

EXAMPLE 38

A film body was formed on the surface of a glass substrate by spin coating in the same manner as Example 35, dried and then burned. Then the glass substrate was maintained in a $F_2$ gas atmosphere (temperature 25° C.) at pressure of 38 Torr for 10 minutes to modify the surface of the film body, to form a fluoride layer on the surface of the film body. The thus-formed glass substrate was referred to as "Example 38".

EXAMPLE 39

A film body was formed on the surface of a glass substrate by spin coating in the same manner as Example 35, dried and then burned. Then the glass substrate was maintained in a $F_2$ gas atmosphere (temperature 25° C.) at pressure of 38 Torr for 60 minutes to modify the surface of the film body, to form a fluoride layer on the surface of the film body. The thus-formed glass substrate was referred to as "Example 39".

EXAMPLE 40

A film body was formed on the surface of a glass substrate by spin coating in the same manner as Example 35, dried and then burned. Then the glass substrate was maintained in a $F_2$ gas atmosphere (temperature 25° C.) at pressure of 7.6 Torr for 10 minutes to modify the surface of the film body, to form a fluoride layer on the surface of the film body. The thus-formed glass substrate was referred to as "Example 40".

EXAMPLE 41

A film body was formed on the surface of a glass substrate by spin coating in the same manner as Example 35, dried and then burned. Then the glass substrate was maintained in an atmosphere (temperature 25° C.) of a gas mixture containing $F_2$ gas at partial pressure of 7.6 Torr and $N_2$ gas at partial pressure of 752 Torr for 10 minutes to modify the surface of the film body, to form a fluoride layer on the surface of the film body. The thus-formed glass substrate was referred to as "Example 41".

EXAMPLE 42

A film body was formed on the surface of a glass substrate by spin coating in the same manner as Example 35, dried and then burned. Then the glass substrate was maintained in a $F_2$ gas atmosphere (temperature 100° C.) at pressure of 7.6 Torr for 10 minutes to modify the surface of the film body, to form a fluoride layer on the surface of the film body. The thus-formed glass substrate was referred to as "Example 42".

EXAMPLE 43

A film body was formed on the surface of a glass substrate by spin coating in the same manner as Example 35, dried and then burned. Then the glass substrate was maintained in a HF gas atmosphere (temperature 25° C.) at pressure of 38 Torr for 1 minute to modify the surface of the film body, to form a fluoride layer on the surface of the film body. The thus-formed glass substrate was referred to as "Example 43".

EXAMPLE 44

A film body was formed on the surface of a glass substrate by spin coating in the same manner as Example 35, dried and then burned. Then the glass substrate was maintained in an atmosphere (temperature 25° C.) of a gas mixture containing HF gas at partial pressure of 7.6 Torr and $N_2$ gas at partial pressure of 752 Torr for 10 minutes to modify the surface of the film body, to form a fluoride layer on the surface of the film body. The thus-formed glass substrate was referred to as "Example 44".

EXAMPLE 45

5% by weight of MgO powder (produced by Ube Materials) produced by a vapor phase method and having an average particle size of 100 Å, 1.25% by weight of magnesium diethoxide as a binder for a MgO component, 2% by weight of ethyl cellulose, and 92.75% by weight of methyl cellosolve as a solvent were mixed to prepare a uniform coating solution for a film containing MgO powder. The thus-prepared coating solution was used for forming a film body on a glass substrate by the same method as Example 35. Next, the surface of the film body was modified to form a fluoride layer on the surface thereof. The thus-formed glass substrate was referred to as "Example 45".

EXAMPLE 46

5 g of MgO powder (produced by Ube Materials) produced by a vapor phase method and having an average particle size of 100 Å was maintained in a $F_2$ gas atmosphere (temperature 25° C.) at pressure of 152 Torr for 10 minutes to modify the surface of the MgO powder, to coat the surface of the MgO powder with a fluoride layer. The MgO powder was referred to as MgO powder of Example 46.

On the other hand, display electrodes (thickness of 5 μm) made of Ag were formed on a front glass substrate having a thickness of 3 mm by screen printing, and then a transparent dielectric layer (thickness of 20 μm) made of glass was formed thereon by screen printing. Next, 5% by weight of MgO powder with the surface coated with a fluoride layer, 75% by weight of organic acid magnesium (Magnesium Naphthenate, produced by Nihon Kagaku Sangyo Co., Ltd.) and 2% by weight of ethyl cellulose as a binder, and 18% by weight of α-terpineol as a solvent were mixed to prepare paste for a film. The thus-prepared paste for a film was coated on the glass substrate by screen printing to form a film body. Furthermore, the glass substrate was dried by maintaining at 150° C. in air for 30 minutes, and then burned by maintaining at 580° C. in air for 10 minutes. The thus-formed glass substrate was referred to as "Example 46".

EXAMPLE 47

The same MgO powder as Example 46 was maintained in a $F_2$ gas atmosphere (temperature 25° C.) at pressure of 72 Torr for 10 minutes to form a fluoride layer on the surface of the MgO powder. The MgO powder was used for forming a film body on a glass substrate by the same method as Example 46. The MgO powder having the surface coated with the fluoride layer, and the glass substrate were referred to as "Example 47".

EXAMPLE 48

The same MgO powder as Example 46 was maintained in a $F_2$ gas atmosphere (temperature 25° C.) at pressure of 38 Torr for 1 minute to form a fluoride layer on the surface of the MgO powder. The MgO powder was used for forming a film body on a glass substrate by the same method as Example 46. The MgO powder having the surface coated with the fluoride layer, and the glass substrate were referred to as "Example 48".

EXAMPLE 49

The same MgO powder as Example 46 was maintained in a $F_2$ gas atmosphere (temperature 25° C.) at pressure of 38 Torr for 10 minutes to form a fluoride layer on the surface of the MgO powder. The MgO powder was used for forming a film body on a glass substrate by the same method as Example 46. The MgO powder having the surface coated with the fluoride layer, and the glass substrate were referred to as "Example 49".

EXAMPLE 50

The same MgO powder as Example 46 was maintained in a $F_2$ gas atmosphere (temperature 25° C.) at pressure of 38

Torr for 60 minutes to form a fluoride layer on the surface of the MgO powder. The MgO powder was used for forming a film body on a glass substrate by the same method as Example 46. The MgO powder having the surface coated with the fluoride layer, and the glass substrate were referred to as "Example 50".

EXAMPLE 51

The same MgO powder as Example 46 was maintained in a $F_2$ gas atmosphere (temperature 25° C.) at pressure of 7.6 Torr for 10 minutes to form a fluoride layer on the surface of the MgO powder. The MgO powder was used for forming a film body on a glass substrate by the same method as Example 46. The MgO powder having the surface coated with the fluoride layer, and the glass substrate were referred to as "Example 51".

EXAMPLE 52

The same MgO powder as Example 46 was maintained in an atmosphere (temperature 25° C.) of a gas mixture containing $F_2$ gas at partial pressure of 7.6 Torr and $N_2$ gas at partial pressure of 752 Torr for 10 minutes to form a fluoride layer on the surface of the MgO powder. The MgO powder was used for forming a film body on a glass substrate by the same method as Example 46. The MgO powder having the surface coated with the fluoride layer, and the glass substrate were referred to as "Example 52".

EXAMPLE 53

The same MgO powder as Example 46 was maintained in a $F_2$ gas atmosphere (temperature 100° C.) at pressure of 7.6 Torr for 10 minutes to form a fluoride layer on the surface of the MgO powder. The MgO powder was used for forming a film body on a glass substrate by the same method as Example 46. The MgO powder having the surface coated with the fluoride layer, and the glass substrate were referred to as "Example 53".

EXAMPLE 54

The same MgO powder as Example 46 was maintained in a HF gas atmosphere (temperature 25° C.) at pressure of 38 Torr for 1 minute to form a fluoride layer on the surface of the MgO powder. The MgO powder was used for forming a film body on a glass substrate by the same method as Example 46. The MgO powder having the surface coated with the fluoride layer, and the glass substrate were referred to as "Example 54".

EXAMPLE 55

The same MgO powder as Example 46 was maintained in an atmosphere (temperature 25° C.) of a gas mixture containing HF gas at partial pressure of 7.6 Torr and $N_2$ gas at partial pressure of 752 Torr for 10 minutes to form a fluoride layer on the surface of the MgO powder. The MgO powder was used for forming a film body on a glass substrate by the same method as Example 46. The MgO powder having the surface coated with the fluoride layer, and the glass substrate were referred to as "Example 55".

EXAMPLE 56

The same MgO powder as Example 46 was maintained in a $BF_3$ gas atmosphere (temperature 25° C.) at pressure of 7.6 Torr for 10 minutes to form a fluoride layer on the surface of the MgO powder. The MgO powder was used for forming a film body on a glass substrate by the same method as Example 46. The MgO powder having the surface coated with the fluoride layer, and the glass substrate were referred to as "Example 56".

EXAMPLE 57

The same MgO powder as Example 46 was maintained in a $SbF_4$ gas atmosphere (temperature 25° C.) at pressure of 7.6 Torr for 10 minutes to form a fluoride layer on the surface of the MgO powder. The MgO powder was used for forming a film body on a glass substrate by the same method as Example 46. The MgO powder having the surface coated with the fluoride layer, and the glass substrate were referred to as "Example 57".

EXAMPLE 58

The same MgO powder as Example 46 was maintained in a $SF_6$ gas atmosphere (temperature 25° C.) at pressure of 7.6 Torr for 10 minutes to form a fluoride layer on the surface of the MgO powder. The MgO powder was used for forming a film body on a glass substrate by the same method as Example 46. The MgO powder having the surface coated with the fluoride layer, and the glass substrate were referred to as "Example 58".

EXAMPLE 59

A fluoride layer was formed on the surface of a MgO powder under the same conditions as Example 46. The MgO powder was referred to as MgO powder of Example 59.

On the other hand, display electrodes and a transparent dielectric layer were formed on the surface of a glass substrate thereon by the same method as Example 46. Next, 5% by weight of MgO powder with the surface coated with a fluoride layer, 1.25% by weight of magnesium diethoxide as a binder, and 93.75% by weight of ethyl cellosolve as a solvent were mixed to prepare a dispersion for a film. The thus-prepared dispersion for a film was coated on the glass substrate by spin coating to form a film body. Furthermore, the glass substrate was dried by maintaining at 60° C. in air for 30 minutes, and then burned by maintaining at 580° C. in air for 10 minutes. The thus-formed glass substrate was referred to as "Example 59".

EXAMPLE 60

The same MgO powder as Example 59 was maintained in a $F_2$ gas atmosphere (temperature 25° C.) at pressure of 72 Torr for 10 minutes to form a fluoride layer on the surface of the MgO powder. The MgO powder was used for forming a film body on a glass substrate by the same method as Example 59. The MgO powder having the surface coated with the fluoride layer, and the glass substrate were referred to as "Example 60".

EXAMPLE 61

The same MgO powder as Example 59 was maintained in a $F_2$ gas atmosphere (temperature 25° C.) at pressure of 38 Torr for 1 minute to form a fluoride layer on the surface of the MgO powder. The MgO powder was used for forming a film body on a glass substrate by the same method as Example 59. The MgO powder having the surface coated with the fluoride layer, and the glass substrate were referred to as "Example 61".

EXAMPLE 62

The same MgO powder as Example 59 was maintained in a $F_2$ gas atmosphere (temperature 25° C.) at pressure of 38

Torr for 10 minutes to form a fluoride layer on the surface of the MgO powder. The MgO powder was used for forming a film body on a glass substrate by the same method as Example 59. The MgO powder having the surface coated with the fluoride layer, and the glass substrate were referred to as "Example 62".

EXAMPLE 63

The same MgO powder as Example 59 was maintained in a $F_2$ gas atmosphere (temperature 25° C.) at pressure of 38 Torr for 60 minutes to form a fluoride layer on the surface of the MgO powder. The MgO powder was used for forming a film body on a glass substrate by the same method as Example 59. The MgO powder having the surface coated with the fluoride layer, and the glass substrate were referred to as "Example 63".

EXAMPLE 64

The same MgO powder as Example 59 was maintained in a $F_2$ gas atmosphere (temperature 25° C.) at pressure of 7.6 Torr for 10 minutes to form a fluoride layer on the surface of the MgO powder. The MgO powder was used for forming a film body on a glass substrate by the same method as Example 59. The MgO powder having the surface coated with the fluoride layer, and the glass substrate were referred to as "Example 64"

EXAMPLE 65

The same MgO powder as Example 59 was maintained in an atmosphere (temperature 25° C.) of a gas mixture containing $F_2$ gas at partial pressure of 7.6 Torr and $N_2$ gas at partial pressure of 752 Torr for 10 minutes to form a fluoride layer on the surface of the MgO powder. The MgO powder was used for forming a film body on a glass substrate by the same method as Example 59. The MgO powder having the surface coated with the fluoride layer, and the glass substrate were referred to as "Example 65".

EXAMPLE 66

The same MgO powder as Example 59 was maintained in a $F_2$ gas atmosphere (temperature 100° C.) at pressure of 7.6 Torr for 10 minutes to form a fluoride layer on the surface of the MgO powder. The MgO powder was used for forming a film body on a glass substrate by the same method as Example 59. The MgO powder having the surface coated with the fluoride layer, and the glass substrate were referred to as "Example 66".

EXAMPLE 67

The same MgO powder as Example 59 was maintained in a HF gas atmosphere (temperature 25° C.) at pressure of 38 Torr for 1 minute to form a fluoride layer on the surface of the MgO powder. The MgO powder was used for forming a film body on a glass substrate by the same method as Example 59. The MgO powder having the surface coated with the fluoride layer, and the glass substrate were referred to as "Example 67".

EXAMPLE 68

The same MgO powder as Example 59 was maintained in an atmosphere (temperature 25° C.) of a gas mixture containing HF gas at partial pressure of 7.6 Torr and $N_2$ gas at partial pressure of 752 Torr for 10 minutes to form a fluoride layer on the surface of the MgO powder. The MgO powder was used for forming a film body on a glass substrate by the same method as Example 59. The MgO powder having the surface coated with the fluoride layer, and the glass substrate were referred to as "Example 68".

EXAMPLE 69

A film body was formed on a glass substrate by the same method as Example 59 except that magnesium trifluoroacetate was used as a binder, and the burning temperature was 500° C. The MgO powder having the surface coated with the fluoride layer, and the glass substrate were referred to as "Example 69".

EXAMPLE 70

A film body was formed on a glass substrate by the same method as Example 69 except that magnesium trifluoroacetylacetonate was used as a binder, and the burning temperature was 500° C. The MgO powder having the surface coated with the fluoride layer, and the glass substrate were referred to as "Example 70".

EXAMPLE 71

A film body was formed on a glass substrate by the same method as Example 69 except that magnesium hexafluoroacetylacetonate was used as a binder, and the burning temperature was 500° C. The MgO powder having the surface coated with the fluoride layer, and the glass substrate were referred to as "Example 71".

COMPARATIVE EXAMPLE 1

A film body was formed on a glass substrate by electron beam evaporation in the same manner as Example 1 except that the surface of the film body was not modified. The thus-obtained glass substrate was referred to as "Comparative Example 1".

COMPARATIVE EXAMPLE 2

A film body was formed on a glass substrate by sputtering in the same manner as Example 14 except that the surface of the film body was not modified. The thus-obtained glass substrate was referred to as "Comparative Example 2".

COMPARATIVE EXAMPLE 3

A film body was formed on a glass substrate by screen printing, dried and then burned in the same manner as Example 24 except that the surface of the film body was not modified. The thus-obtained glass substrate was referred to as "Comparative Example 3".

COMPARATIVE EXAMPLE 4

A film body was formed on a glass substrate by screen printing, dried and then burned in the same manner as Example 34 except that the surface of the film body was not modified. The thus-obtained glass substrate was referred to as "Comparative Example 4".

COMPARATIVE EXAMPLE 5

A film body was formed on a glass substrate by spin coating, dried and then burned in the same manner as Example 35 except that the surface of the film body was not modified. The thus-obtained glass substrate was referred to as "Comparative Example 5".

COMPARATIVE EXAMPLE 6

A film body was formed on a glass substrate by spin coating, dried and then burned in the same manner as Example 45 except that the surface of the film body was not modified. The thus-obtained glass substrate was referred to as "Comparative Example 6".

COMPARATIVE EXAMPLE 7

A film body was formed on a glass substrate by screen printing in the same manner as Example 46 except that a MgO powder having an unmodified surface was used. The MgO powder and glass substrate were referred to as "Comparative Example 7".

COMPARATIVE EXAMPLE 8

A film body was formed on a glass substrate by spin coating in the same manner as Example 59 except that a MgO powder having an unmodified surface was used. The MgO powder and glass substrate were referred to as "Comparative Example 8".

Comparison Test 1 and Evaluation

In each of Examples 1 to 45 and Comparative Examples 1 to 6, the thickness of the fluoride layer formed on the surface of the film body on the glass substrate was measured by elemental analysis in the depth direction by X-ray photoelectron spectroscopy.

The environment resistance of each of the film bodies was evaluated by difficulty in changing from MgO to carbonate ($MgCO_3$). Specifically, each film body was allowed to stand in air at 40° C. and humidity of 90% for 2 weeks, and then the MgO film was subjected to elemental analysis in the depth direction by X-ray photoelectron spectroscopy so that a carbonate layer was evaluated by a depth where carbon derived from magnesium carbonate ($MgCO_3$) was observed. Namely, the smaller the depth, i.e., the thinner the carbonate layer, the more the environment resistance of a protecting film improves.

Furthermore, in each of Examples 1 to 45 and Comparative Examples 1 to 6, the breakdown voltage of the film body was measured by a method in which the glass substrate was set in a chamber, the chamber was evacuated and then filled with a gas mixture of He and 2% Xe gas at 400 Torr, and then a voltage of 10 kHZ was applied.

The results of measurement are shown in Table 1 to 4.

TABLE 1

| | Modification condition of film body (MgO) surface | | | | | | Environment resistance | |
|---|---|---|---|---|---|---|---|---|
| | | | Type and partial pressure of gas | | | | Thickness of | Thickness of | Breakdown |
| Example No. | Temperature (° C.) | Time (min) | Gas | Partial pressure | Gas | Partial pressure | fluoride layer (nm) | carbonate (nm) | voltage Vf (V) |
| 1 | 25 | 10 | $F_2$ | 152 | — | — | 24 | 1 | 160 |
| 2 | 25 | 10 | $F_2$ | 72 | — | — | 16 | 1 | 163 |
| 3 | 25 | 1 | $F_2$ | 38 | — | — | 10 | 3 | 166 |
| 4 | 25 | 10 | $F_2$ | 38 | — | — | 15 | 1 | 160 |
| 5 | 25 | 60 | $F_2$ | 38 | — | — | 30 | 1 | 156 |
| 6 | 25 | 10 | $F_2$ | 7.6 | — | — | 5 | 7 | 167 |
| 7 | 25 | 10 | $F_2$ | 7.6 | $N_2$ | 752 | 6 | 10 | 163 |
| 8 | 100 | 10 | $F_2$ | 7.6 | — | — | 22 | 1 | 157 |
| 9 | 25 | 1 | HF | 38 | — | — | 5 | 12 | 169 |
| 10 | 25 | 10 | HF | 7.6 | $N_2$ | 752 | 2 | 15 | 166 |
| 11 | 25 | 10 | $BF_3$ | 7.6 | — | — | 4 | 10 | 165 |
| 12 | 25 | 10 | $SbF_5$ | 7.6 | — | — | 5 | 7 | 165 |
| 13 | 25 | 10 | $SF_4$ | 7.6 | — | — | 2 | 11 | 168 |
| Comp. Example 1 | — | — | — | — | — | — | Untreatad | 17 | 172 |

TABLE 2

| | Modification condition of film body (MgO) surface | | | | | | Environment resistance | |
|---|---|---|---|---|---|---|---|---|
| | | | Type and partial pressure of gas | | | | Thickness of | Thickness of | Breakdown |
| Example No. | Temperature (° C.) | Time (min) | Gas | Partial pressure | Gas | Partial pressure | fluoride layer (nm) | carbonate (nm) | voltage Vf (V) |
| 14 | 25 | 10 | $F_2$ | 152 | — | — | 10 | 1 | 155 |
| 15 | 25 | 10 | $F_2$ | 72 | — | — | 9 | 1 | 158 |
| 16 | 25 | 1 | $F_2$ | 38 | — | — | 5 | 1 | 162 |
| 17 | 25 | 10 | $F_2$ | 38 | — | — | 9 | 1 | 158 |
| 18 | 25 | 60 | $F_2$ | 38 | — | — | 17 | 1 | 157 |
| 19 | 25 | 10 | $F_2$ | 7.6 | — | — | 4 | 3 | 162 |
| 20 | 25 | 10 | $F_2$ | 7.6 | $N_2$ | 752 | 4 | 6 | 163 |
| 21 | 100 | 10 | $F_2$ | 7.6 | — | — | 10 | 1 | 156 |
| 22 | 25 | 1 | HF | 38 | — | — | 2 | 7 | 160 |
| 23 | 25 | 10 | HF | 7.6 | $N_2$ | 752 | 1 | 7 | 160 |
| Comp. Example 2 | — | — | — | — | — | — | Untreated | 10 | 165 |

TABLE 3

| | Modification condition of film body (MgO) surface | | | | | | Environment resistance | | |
|---|---|---|---|---|---|---|---|---|---|
| | | | | Type and partial pressure of gas | | | Thickness of | Thickness of | Breakdown |
| Example No. | Temperature (°C.) | Time (min) | Gas | Partial pressure | Gas | Partial pressure | fluoride layer (nm) | carbonate (nm) | voltage Vf (V) |
| 24 | 25 | 10 | $F_2$ | 152 | — | — | 36 | 2 | 182 |
| 25 | 25 | 10 | $F_2$ | 72 | — | — | 24 | 2 | 184 |
| 26 | 25 | 1 | $F_2$ | 38 | — | — | 12 | 5 | 189 |
| 27 | 25 | 10 | $F_2$ | 38 | — | — | 20 | 3 | 185 |
| 28 | 25 | 60 | $F_2$ | 38 | — | — | 44 | 1 | 179 |
| 29 | 25 | 10 | $F_2$ | 7.6 | — | — | 8 | 10 | 190 |
| 30 | 25 | 10 | $F_2$ | 7.6 | $N_2$ | 752 | 8 | 12 | 184 |
| 31 | 100 | 10 | $F_2$ | 7.6 | — | — | 30 | 1 | 180 |
| 32 | 25 | 1 | HF | 38 | — | — | 6 | 15 | 190 |
| 33 | 25 | 10 | HF | 7.6 | $N_2$ | 752 | 4 | 20 | 189 |
| 34 | 25 | 10 | $F_2$ | 152 | — | — | 420 | 5 | 188 |
| Comp. Example 3 | — | — | — | — | — | — | Untreated | 22 | 196 |
| Comp. Example 4 | — | — | — | — | — | — | Untreated | 510 | 201 |

TABLE 4

| | Modification condition of film body (MgO) surface | | | | | | Environment resistance | | |
|---|---|---|---|---|---|---|---|---|---|
| | | | | Type and partial pressure of gas | | | Thickness of | Thickness of | Breakdown |
| Example No. | Temperature (°C.) | Time (min) | Gas | Partial pressure | Gas | Partial pressure | fluoride layer (nm) | carbonate (nm) | voltage Vf (V) |
| 35 | 25 | 10 | $F_2$ | 152 | — | — | 42 | 2 | 180 |
| 36 | 25 | 10 | $F_2$ | 72 | — | — | 20 | 4 | 185 |
| 37 | 25 | 1 | $F_2$ | 38 | — | — | 8 | 7 | 190 |
| 38 | 25 | 10 | $F_2$ | 38 | — | — | 26 | 4 | 185 |
| 39 | 25 | 60 | $F_2$ | 38 | — | — | 35 | 2 | 183 |
| 40 | 25 | 10 | $F_2$ | 7.6 | — | — | 12 | 8 | 190 |
| 41 | 25 | 10 | $F_2$ | 7.6 | $N_2$ | 752 | 14 | 10 | 184 |
| 42 | 100 | 10 | $F_2$ | 7.6 | — | — | 30 | 3 | 183 |
| 43 | 25 | 1 | HF | 38 | — | — | 6 | 18 | 190 |
| 44 | 25 | 10 | HF | 7.6 | $N_2$ | 752 | 6 | 18 | 191 |
| 45 | 25 | 10 | $F_2$ | 152 | — | — | 510 | 7 | 189 |
| Comp. Example 5 | — | — | — | — | — | — | Untreated | 30 | 195 |
| Comp. Example 6 | — | — | — | — | — | — | Untreated | 560 | 200 |

Tables 1 to 4 indicate that in Comparative Examples 1 to 3 and 5, the thicknesses of the carbonate layers ($MgCO_3$) formed on the film bodies are as large as 17 nm, 10 nm, 22 m, and 30 nm, respectively, and in Comparative Examples 4 and 6 containing a MgO powder, carbonate ($MgCO_3$) is formed substantially over the entire film body. On the other hand, in each of Examples 1 to 45, the thickness of the carbonate layer is 1 to 20 nm which is smaller than the corresponding comparative example. It is also found that as the thickness of the fluoride layer formed on the surface of the film body increases, the thickness of the carbonate layer decreases.

In Comparative Examples 1 and 2, the breakdown voltages are 172 and 165 V, respectively, while in Examples 1 to 23 corresponding to Comparative Examples 1 and 2, the breakdown voltages are a slightly lower value of 155 to 169 V. In Comparative Examples 3 to 6, the breakdown voltage are 195 to 201 V, while in Examples 24 to 45 corresponding to Comparative Examples 3 to 6, the breakdown voltages are a lower value of 179 to 191 V. It is thus found that in Examples of the present invention, the secondary electron emitting ability is high, and thus the performance of PDP is improved.

Comparison Test 2 and Evaluation

In Examples 46 to 71 and Comparative Examples 7 and 8, it was difficult to measure the thickness of the fluoride layers formed on the surfaces of the MgO powder because the MgO powder was fine. Therefore, as a reference, the thickness of a fluoride layer formed on the surface a MgO sputtered film under the same conditions as Examples and Comparative Examples was measured by elemental analysis in the depth direction by X-ray photoelectron spectroscopy.

The environment resistance of MgO powder was evaluated by difficulty in changing from MgO to carbonate ($MgCO_3$) in the same manner as Comparison Test 1. Specifically, the MgO powder was allowed to stand in air at 40° C. and humidity of 90% for 2 weeks, the carbonate layer on the surface of the MgO powder was evaluated by a relative value (a. u.: arbitrary unit) of absorbance at a peak near 1450 $cm^{-1}$ derived from the carbonate in diffuse reflectance infrared spectroscopy (FT-IR). The smaller the relative value of the absorbance, i.e., the thinner the carbonate layer, the more the environment resistance of the MgO powder improves. Furthermore, the breakdown voltage (Vf) of the MgO film was measured by the same method as Comparison Test 1. The results of measurement are shown in Tables 5 and 6.

power was used in place of the MgO powder. The thus-obtained glass substrates are respectively referred to as "Examples 101 to 128".

TABLE 5

| | Modification condition of powder (MgO) surface | | | | | | Environment | | |
|---|---|---|---|---|---|---|---|---|---|
| | | | Type and partial pressure of gas | | | | Thickness of | resistance | Breakdown |
| Example No. | Temperature (° C.) | Time (min) | Gas | Partial pressure | Gas | Partial pressure | fluoride layer (nm) | Carbonate (a. u.) | voltage Vf (V) |
| 46 | 25 | 10 | $F_2$ | 152 | — | — | 10 | 10 | 179 |
| 47 | 25 | 10 | $F_2$ | 72 | — | — | 9 | 9 | 180 |
| 48 | 25 | 1 | $F_2$ | 38 | — | — | 5 | 25 | 187 |
| 49 | 25 | 10 | $F_2$ | 38 | — | — | 9 | 10 | 185 |
| 50 | 25 | 60 | $F_2$ | 38 | — | — | 17 | 7 | 180 |
| 51 | 25 | 10 | $F_2$ | 7.6 | — | — | 4 | 48 | 186 |
| 52 | 25 | 10 | $F_2$ | 7.6 | $N_2$ | 752 | 4 | 48 | 181 |
| 53 | 100 | 10 | $F_2$ | 7.6 | — | — | 10 | 3 | 181 |
| 54 | 25 | 1 | HF | 38 | — | — | 2 | 65 | 187 |
| 55 | 25 | 10 | HF | 7.6 | $N_2$ | 752 | 1 | 58 | 186 |
| 56 | 25 | 10 | $BF_3$ | 7.6 | — | — | 3 | 49 | 186 |
| 57 | 25 | 10 | $SbF_5$ | 7.6 | — | — | 3 | 47 | 185 |
| 58 | 25 | 10 | $SF_4$ | 7.6 | — | — | 1 | 53 | 187 |
| Comp. Example 7 | — | — | — | — | — | — | Untreated | 78 | 195 |

TABLE 6

| | Modification condition of powder (MgO) surface | | | | | | Environment | | |
|---|---|---|---|---|---|---|---|---|---|
| | | | Type and partial pressure of gas | | | | Thickness of | resistance | Breakdown |
| Example No. | Temperature (° C.) | Time (min) | Gas | Partial pressure | Gas | Partial pressure | fluoride layer (nm) | Carbonate (a. u.) | voltage Vf (V) |
| 59 | 25 | 10 | $F_2$ | 152 | — | — | 10 | 10 | 177 |
| 60 | 25 | 10 | $F_2$ | 72 | — | — | 9 | 9 | 179 |
| 61 | 25 | 1 | $F_2$ | 38 | — | — | 5 | 25 | 185 |
| 62 | 25 | 10 | $F_2$ | 38 | — | — | 9 | 10 | 180 |
| 63 | 25 | 60 | $F_2$ | 38 | — | — | 17 | 7 | 177 |
| 64 | 25 | 10 | $F_2$ | 7.6 | — | — | 4 | 48 | 188 |
| 65 | 25 | 10 | $F_2$ | 7.6 | $N_2$ | 752 | 4 | 48 | 180 |
| 66 | 100 | 10 | $F_2$ | 7.6 | — | — | 10 | 3 | 179 |
| 67 | 25 | 1 | HF | 38 | — | — | 2 | 65 | 185 |
| 68 | 25 | 10 | HF | 7.6 | $N_2$ | 752 | 1 | 58 | 183 |
| 69 | 25 | 10 | $F_2$ | 152 | — | — | 10 | 10 | 170 |
| 70 | 25 | 10 | $F_2$ | 152 | — | — | 10 | 10 | 172 |
| 71 | 25 | 10 | $F_2$ | 152 | — | — | 10 | 10 | 171 |
| Comp. Example 8 | — | — | — | — | — | — | Untreated | 78 | 196 |

Tables 5 and 6 indicate that in Comparative Examples 7 and 8, the amounts of carbonate ($MgCO_3$) formed on the MgO powder surfaces are as large as 78, while in Examples 46 to 71, the amounts of carbonate are as small as 3 to 65. It is also found that the thicker the fluoride layer formed on the MgO powder (MgO sputtered film) surface, the smaller the amount of carbonate.

In Comparative Examples 7 and 8, the breakdown voltages are 195 and 196 V, respectively, while in Examples 46 to 71, the breakdown voltages are as low as 170 to 188 V. It is thus found that in Examples of the present invention, the secondary electron emitting ability is high, and thus the performance of PDP is improved.

EXAMPLES 101 to 128

A film body was formed on a glass substrate, and a fluoride layer was formed on the surface of the film body by the same method as each of Examples 1 to 14, 16, 18, 21, 23, 24, 26, 28, 31, 33, 34, 37, 39, 42 and 44 except that a CaO EXAMPLES 129 to 153

A CaO powder was coated with a fluoride layer, and then used for forming a film body on the surface of a glass substrate by the same method as each of examples 46 to 63 and 65 to 71 except that a CaO powder (average particle size: 500 Å) produced by precipitation in water was used in place of the MgO powder (average particle size: 100 Å) produced by a vapor phase method. The thus-obtained CaO powder coated with the fluoride layer and glass substrates are respectively referred to as "Examples 129 to 153".

COMPARATIVE EXAMPLES 101 to 104

A film body was formed on a glass substrate without modification of the surface of the film body by the same method as each of Comparative Examples 1 to 3 and 5 except that a CaO power was used in place of the MgO powder. The thus-obtained glass substrates are respectively referred to as "Comparative Examples 101 to 104".

COMPARATIVE EXAMPLES 105 and 106

A CaO powder having the unmodified surface was used for forming a film body on the surface of a glass substrate by the same method as each of Comparative examples 7 and 8 except that a CaO powder (average particle size: 500 Å) produced by an underwater synthetic method was used in place of the MgO powder (average particle size: 100 Å) produced by a vapor phase method. The thus-obtained CaO powder and glass substrates are respectively referred to as "Examples 105 and 106".

Comparison Test 3 and Evaluation

In each of Examples 101 to 128 and Comparative Examples 101 to 104, the thickness of the fluoride layer formed on the surface of the film body on the glass substrate was measured by elemental analysis in the depth direction by X-ray photoelectron spectroscopy.

The environment resistance of each of the film bodies was evaluated by difficulty in changing from CaO to carbonate ($CaCO_3$). Specifically, each film body was allowed to stand in air ($CO_2$ concentration: about 300 ppm) at 40° C. and humidity of 90% for 2 weeks, and then subjected to elemental analysis in the depth direction by X-ray photoelectron spectroscopy so that a carbonate layer was evaluated by a depth where carbon derived from calcium carbonate ($CaCO_3$) was observed. Namely, the smaller the depth, i.e., the thinner the carbonate layer, the more the environment resistance of a protecting film improves.

Furthermore, in each of Examples 101 to 128 and Comparative Examples 101 to 104, the breakdown voltage of the film body was measured by a method in which the glass substrate was set in a chamber, the chamber was evacuated and then filled with a gas mixture of He and 2% Xe gas at 400 Torr, and then a voltage of 10 kHZ was applied.

The results of measurement are shown in Table 7 and 8.

TABLE 7

| | Modification condition of film body (CaO) surface | | | | | | Environment resistance | |
|---|---|---|---|---|---|---|---|---|
| | | | Type and partial pressure of gas | | | | Thickness of | Thickness of | Breakdown |
| Example No. | Temperature (° C.) | Time (min) | Gas | Partial pressure | Gas | Partial pressure | fluoride layer (nm) | carbonate (nm) | voltage Vf (V) |
| 101 | 25 | 10 | $F_2$ | 152 | — | — | 30 | 1 | 165 |
| 102 | 25 | 10 | $F_2$ | 72 | — | — | 18 | 1 | 162 |
| 103 | 25 | 1 | $F_2$ | 38 | — | — | 15 | 1 | 160 |
| 104 | 25 | 10 | $F_2$ | 38 | — | — | 12 | 2 | 162 |
| 105 | 25 | 60 | $F_2$ | 38 | — | — | 26 | 1 | 158 |
| 106 | 25 | 10 | $F_2$ | 7.6 | — | — | 5 | 10 | 172 |
| 107 | 25 | 10 | $F_2$ | 7.6 | $N_2$ | 752 | 10 | 7 | 170 |
| 108 | 100 | 10 | $F_2$ | 7.6 | — | — | 25 | 2 | 163 |
| 109 | 25 | 1 | HF | 38 | — | — | 10 | 8 | 174 |
| 110 | 25 | 10 | HF | 7.6 | $N_2$ | 752 | 3 | 10 | 172 |
| 111 | 25 | 10 | $BF_3$ | 7.6 | — | — | 4 | 12 | 170 |
| 112 | 25 | 10 | $SbF_5$ | 7.6 | — | — | 8 | 5 | 166 |
| 113 | 25 | 10 | $SF_4$ | 7.6 | — | — | 8 | 6 | 167 |
| Comp. Example 101 | — | — | — | — | — | — | Untreated | 20 | 180 |

TABLE 8

| | Modification condition of film body (CaO) surface | | | | | | Environment resistance | |
|---|---|---|---|---|---|---|---|---|
| | | | Type and partial pressure of gas | | | | Thickness of | Thickness of | Breakdown |
| Example No. | Temperature (° C.) | Time (min) | Gas | Partial pressure | Gas | Partial pressure | fluoride layer (nm) | carbonate (nm) | voltage Vf (V) |
| 114 | 25 | 10 | $F_2$ | 152 | — | — | 15 | 1 | 160 |
| 115 | 25 | 1 | $F_2$ | 38 | — | — | 6 | 3 | 162 |
| 116 | 25 | 60 | $F_2$ | 38 | — | — | 17 | 1 | 158 |
| 117 | 100 | 10 | $F_2$ | 7.6 | — | — | 13 | 1 | 160 |
| 118 | 25 | 10 | HF | 7.6 | $N_2$ | 752 | 4 | 3 | 163 |
| 119 | 25 | 10 | $F_2$ | 152 | — | — | 43 | 2 | 185 |
| 120 | 25 | 1 | $F_2$ | 38 | — | — | 19 | 5 | 191 |
| 121 | 25 | 60 | $F_2$ | 38 | — | — | 37 | 3 | 180 |
| 122 | 100 | 10 | $F_2$ | 7.6 | — | — | 33 | 4 | 188 |
| 123 | 25 | 10 | HF | 7.6 | $N_2$ | 752 | 10 | 8 | 194 |
| 124 | 25 | 10 | $F_2$ | 152 | — | — | 37 | 3 | 180 |
| 125 | 25 | 1 | $F_2$ | 38 | — | — | 20 | 3 | 182 |
| 126 | 25 | 60 | $F_2$ | 38 | — | — | 40 | 2 | 176 |
| 127 | 100 | 10 | $F_2$ | 7.6 | — | — | 35 | 2 | 179 |
| 128 | 25 | 10 | HF | 7.6 | $N_2$ | 752 | 8 | 10 | 191 |
| Comp. Example 102 | — | — | — | — | — | — | Untreated | 20 | 200 |

TABLE 8-continued

| | Modification condition of film body (CaO) surface | | | | | | Environment resistance | | |
|---|---|---|---|---|---|---|---|---|---|
| | | | | Type and partial pressure of gas | | | Thickness of | Thickness of | Breakdown |
| Example No. | Temperature (° C.) | Time (min) | Gas | Partial pressure | Gas | Partial pressure | fluoride layer (nm) | carbonate (nm) | voltage Vf (V) |
| Comp. Example 103 | — | — | — | — | — | — | Untreated | 25 | 205 |
| Comp. Example 104 | — | — | — | — | — | — | Untreated | 23 | 206 |

Tables 7 and 8 indicate that in each of Comparative Examples 101 to 104, the thickness of the carbonate layer (CaCO₃) formed on the film body is as large as 20 to 25 nm, while in each of Examples 101 to 128, the thickness of the carbonate layer is as small as 1 to 12 nm. It is also found that as the thickness of the fluoride layer formed on the surface of the film body increases, the thickness of the carbonate layer decreases.

In Comparative Example 101, the breakdown voltage is 180 V, while in Examples 101 to 113 corresponding to Comparative Example 101, the breakdown voltages are a slightly lower value of 158 to 174 V. In Comparative Examples 102 to 104, the breakdown voltages are 200 to 206 V, while in Examples 114 to 128 corresponding to Comparative Examples 102 to 104, the breakdown voltages are a lower value of 158 to 194 V. It is thus found that in Examples of the present invention, the secondary electron emitting ability is high, and thus the performance of PDP is improved.

Comparison Test 4 and Evaluation

In Examples 129 to 153 and Comparative Examples 105 and 106, it was difficult to measure the thickness of the fluoride layers formed on the surfaces of the CaO powder because the CaO powder was fine. Therefore, as a reference, the thickness of a fluoride layer formed on the surface a CaO sputtered film under the same conditions as each of Examples and Comparative Examples was measured by elemental analysis in the depth direction by X-ray photoelectron spectroscopy.

The environment resistance of the CaO powder was evaluated by difficulty in changing from CaO to carbonate (CaCO₃) in the same manner as Comparison Test 3. Specifically, the CaO powder was allowed to stand in air (CO₂ concentration: about 300 ppm) at 40° C. and humidity or 90% for 2 weeks, the carbonate layers on the surfaces of the CaO powder were evaluated by a relative value (a. u.: arbitrary unit) of absorbance at a peak near 1450 cm⁻¹ derived from the carbonate in diffuse reflectance infrared spectroscopy (FT-IR). The smaller the relative value of the absorbance, i.e., the thinner the carbonate layer, the more the environment resistance of the CaO powder improves. Furthermore, the breakdown voltage (Vf) of each film body was measured by the same method as Comparison Test 3. The results of measurement are shown in Tables 9 and 10.

TABLE 9

| | Modification condition of powder (CaO) surface | | | | | | | Environment | |
|---|---|---|---|---|---|---|---|---|---|
| | | | | Type and partial pressure of gas | | | Thickness of | resistance | Breakdown |
| Example No. | Temperature (° C.) | Time (min) | Gas | Partial pressure | Gas | Partial pressure | fluoride layer (nm) | Carbonate (a. u.) | voltage Vf (V) |
| 129 | 25 | 10 | F₂ | 152 | — | — | 15 | 9 | 183 |
| 130 | 25 | 10 | F₂ | 72 | — | — | 11 | 21 | 181 |
| 131 | 25 | 1 | F₂ | 38 | — | — | 6 | 20 | 190 |
| 132 | 25 | 10 | F₂ | 38 | — | — | 15 | 12 | 183 |
| 133 | 25 | 60 | F₂ | 38 | — | — | 17 | 8 | 180 |
| 134 | 25 | 10 | F₂ | 7.6 | — | — | 10 | 25 | 185 |
| 135 | 25 | 10 | F₂ | 7.6 | N₂ | 752 | 9 | 24 | 196 |
| 136 | 100 | 10 | F₂ | 7.6 | — | — | 13 | 15 | 195 |
| 137 | 25 | 1 | HF | 38 | — | — | 4 | 40 | 195 |
| 138 | 25 | 10 | HF | 7.6 | N₂ | 752 | 4 | 52 | 196 |
| 139 | 25 | 10 | BF₂ | 7.6 | — | — | 8 | 33 | 188 |
| 140 | 25 | 10 | SbF₅ | 7.6 | — | — | 6 | 40 | 190 |
| 141 | 25 | 10 | SF₄ | 7.6 | — | — | 5 | 38 | 191 |
| Comp. Example 105 | — | — | — | — | — | — | Untreated | 92 | 206 |

TABLE 10

| Example No. | Modification condition of powder (CaO) surface | | | | | | Thickness of fluoride layer (nm) | Environment resistance Carbonate (a. u.) | Breakdown voltage Vf (V) |
|---|---|---|---|---|---|---|---|---|---|
| | Temperature (° C.) | Time (min) | Gas | Partial pressure | Gas | Partial pressure | | | |
| 142 | 25 | 10 | $F_2$ | 152 | — | — | 15 | 9 | 180 |
| 143 | 25 | 10 | $F_2$ | 72 | — | — | 11 | 21 | 185 |
| 144 | 25 | 1 | $F_2$ | 38 | — | — | 6 | 20 | 186 |
| 145 | 25 | 10 | $F_2$ | 38 | — | — | 15 | 12 | 180 |
| 146 | 25 | 60 | $F_2$ | 38 | — | — | 17 | 8 | 176 |
| 147 | 25 | 10 | $F_2$ | 7.6 | $N_2$ | 752 | 9 | 24 | 188 |
| 148 | 100 | 10 | $F_2$ | 7.6 | — | — | 13 | 15 | 180 |
| 149 | 25 | 1 | HF | 38 | — | — | 4 | 40 | 189 |
| 150 | 25 | 10 | HF | 7.6 | $N_2$ | 752 | 4 | 52 | 192 |
| 151 | 25 | 10 | $F_2$ | 152 | — | — | 15 | 9 | 176 |
| 152 | 25 | 10 | $F_2$ | 152 | — | — | 15 | 9 | 179 |
| 153 | 25 | 10 | $F_2$ | 152 | — | — | 15 | 9 | 183 |
| Comp. Example 106 | — | — | — | — | — | — | Untreated | 92 | 199 |

Tables 9 and 10 indicate that in Comparative Examples 105 and 106, the amounts of carbonate formed on the CaO powder surfaces are as large as 92, while in Examples 129 to 153, the amounts of carbonate are as small as 8 to 52. It is also found that the thicker the fluoride layer formed on the CaO powder (CaO sputtered film) surface, the smaller the amount of carbonate.

In Comparative Examples 105 and 106, the breakdown voltages are 206 and 199 V, respectively, while in Examples 129 to 153, the breakdown voltages are as low as 176 to 196 V. It is thus found that in Examples of the present invention, the secondary electron emitting ability is high, and thus the performance of PDP is improved.

EXAMPLES 201 to 227

First, display electrodes (thickness 5 μm) composed of Ag were formed on the surface of a glass substrate having a thickness of 3 mm by screen printing, and then a transparent dielectric layer (thickness 20 μm) composed of glass was formed thereon by screen printing, as shown in FIG. 1. Next, the glass substrate was dried by maintaining in air at 150° C. for 30 minutes, and then burned in air at 550° C. for 30 minutes.

A film body (deposited film) was formed on the surface of the glass substrate by electron beam evaporation using each of the various evaporated materials shown in Table 11 by the same operation as Example 101. Then, the surface of the film body of the glass substrate was modified under the conditions shown in Table 11 to form a fluoride layer on the surface of the film body. The thus-obtained glass substrates are respectively referred to as "Examples 201 to 227". In Examples 224 to 227, a film was deposited by using an evaporated material comprising MgO and 2 mol % of each of $LaB_6$, $La_2O_3$, $Sc_2O_3$, and $Y_2O_3$, and then modified with fluorine.

EXAMPLES 228 to 250

5 g of oxide powder (average particle size: about 500 Å) produced by precipitation in water was fluorinated under the conditions shown in Table 12 to modify the surfaces of the oxide powder. Namely, the surfaces of the oxide powder were coated with fluoride layers. The thus-obtained oxide powders were respectively referred to as "the oxide powders of Examples 228 to 250".

On the other hand, display electrodes (thickness of 5 μm) made of Ag were formed on a front glass substrate having a thickness of 3 mm by screen printing, and then a transparent dielectric layer (thickness of 20 μm) made of glass was formed thereon by screen printing, as shown in FIG. 3. Next, 5% by weight oxide powder having the surface coated with the fluoride layer, 1.25% by weight of organic acid compound (which decomposes to each of the oxides shown in Table 12 after burning) as a binder, and 93.75% by weight of ethyl cellosolve as a solvent were mixed to prepare a dispersion for a film. The thus-prepared dispersion was coated on the glass substrate by spin coating to form a film body (spin-coated film). Furthermore, the glass substrate was dried by maintaining at 60° C. in air for 30 minutes, and then burned by maintaining at 580° C. in air for 10 minutes. The thus-formed glass substrates were respectively referred to as "the glass substrates of Examples 228 to 250".

COMPARATIVE EXAMPLES 201 to 227

A film body (deposited film) was formed on a glass substrate by electron beam evaporation in the same manner as each of Examples 201 to 227 except that the surface of the film body was not modified. The thus-obtained glass substrates were respectively referred to as "Comparative Examples 201 to 227".

COMPARATIVE EXAMPLES 228 to 250

A film body (oxide film) was formed on a glass substrate by spin coating in the same manner as each of Examples 228 to 250 except that an oxide powder having the unmodified surface was used. The thus-obtained oxide compound powders and glass substrates were respectively referred to as "Comparative Examples 228 to 250".

Comparison Test 5 and Evaluation

In each of Examples 201 to 227 and Comparative Examples 201 to 227, the thickness of the fluoride layer formed on the surface of the film body on the glass substrate was measured by elemental analysis in the depth direction by X-ray photoelectron spectroscopy.

The environment resistance of each of the film bodies was evaluated by difficulty in changing to carbonate. Specifically, a film body was allowed to stand in air ($CO_2$ concentration: about 300 ppm) at 40° C. and humidity of 90% for 2 weeks, and then subjected to elemental analysis in the depth direction by X-ray photoelectron spectroscopy so that a carbonate layer was evaluated by a depth where carbon derived from the carbonate was observed. Namely, the smaller the depth, i.e., the thinner the carbonate layer, the more the environment resistance of a protecting film improves.

Furthermore, in each of Examples 201 to 227 and Comparative Examples 201 to 227, the breakdown voltage of the film body was measured by a method in which the glass substrate was set in a chamber, the chamber was evacuated and then filled with a gas mixture of He and 2% Xe gas at 400 Torr, and then a voltage of 10 kHZ was applied. The results of measurement are shown in Table 11 and 12.

TABLE 11

| Example No. | Evaporated material | Modification condition of film body surface | | | | Thickness of fluoride layer (nm) | Environment resistance Thickness of carbonate (nm) | Breakdown voltage Vf (V) |
| --- | --- | --- | --- | --- | --- | --- | --- | --- |
| | | Temperature (° C.) | Time (min) | Type of gas | Partial pressure of gas | | | |
| 201 | SrO | 25 | 1 | HF | 38 | 16 | 1 | 160 |
| 202 | BaO | " | " | " | " | 15 | 1 | 165 |
| 203 | (Ca.Sr)O | " | " | " | " | 12 | 2 | 155 |
| 204 | (Mg.Sr)O | " | " | " | " | 10 | 2 | 156 |
| 205 | (Sr.Ba)O | " | " | " | " | 16 | 1 | 160 |
| 206 | $Y_2O_3$ | " | " | " | " | 8 | 2 | 192 |
| 207 | $Gd_2O_3$ | " | " | " | " | 6 | 1 | 188 |
| 208 | $Dy_2O_3$ | " | " | " | " | 5 | 2 | 182 |
| 209 | $CeO_2$ | " | " | " | " | 10 | 2 | 190 |
| 210 | $La_2O_3$ | " | " | " | " | 7 | 4 | 176 |
| 211 | $Yb_2O_3$ | " | " | " | " | 7 | 3 | 178 |
| 212 | $MgGd_2O_4$ | " | " | " | " | 7 | 3 | 182 |
| 213 | $MgY_2O_4$ | " | " | " | " | 8 | 3 | 176 |
| 214 | $MgLa_2O_4$ | " | " | " | " | 6 | 2 | 172 |
| 215 | $CaGd_2O_4$ | " | " | " | " | 5 | 1 | 185 |
| 216 | $CaY_2O_4$ | " | " | " | " | 7 | 1 | 181 |
| 217 | $CaLa_2O_4$ | " | " | " | " | 9 | 2 | 180 |
| 218 | $SrGd_2O_4$ | " | " | " | " | 10 | 4 | 171 |
| 219 | $SrY_2O_4$ | " | " | " | " | 10 | 4 | 168 |
| 220 | $SrLa_2O_4$ | " | " | " | " | 12 | 3 | 174 |
| 221 | $BaGd_2O_4$ | " | " | " | " | 15 | 3 | 177 |
| 222 | $BaY_2O_4$ | " | " | " | " | 18 | 1 | 182 |
| 223 | $BaLa_2O_4$ | " | " | " | " | 16 | 1 | 180 |
| 224 | $MaO:LaB_6$ | " | " | " | " | 10 | 2 | 162 |
| 225 | $MgO:La_2O_3$ | " | " | " | " | 8 | 4 | 158 |
| 226 | $MgO:Sc_2O_3$ | " | " | " | " | 12 | 5 | 157 |
| 227 | $MgO:Y_2O_3$ | " | " | " | " | 12 | 2 | 158 |

TABLE 12

| Comparative Example No. | Evaporated material | Modification condition of film body surface | | | | Thickness of fluoride layer (nm) | Environment resistance Thickness of carbonate (nm) | Breakdown voltage Vf (V) |
| --- | --- | --- | --- | --- | --- | --- | --- | --- |
| | | Temperature (° C.) | Time (min) | Type of gas | Partial pressure of gas | | | |
| 201 | SrO | — | — | — | — | — | 22 | 185 |
| 202 | BaO | — | — | — | — | — | 28 | 186 |
| 203 | (Ca.Sr)O | — | — | — | — | — | 25 | 179 |
| 204 | (Mg.Sr)O | — | — | — | — | — | 22 | 176 |
| 205 | (Sr.Ba)O | — | — | — | — | — | 25 | 191 |
| 206 | $Y_2O_3$ | — | — | — | — | — | 18 | 213 |
| 207 | $Gd_2O_3$ | — | — | — | — | — | 20 | 206 |
| 208 | $Dy_2O_3$ | — | — | — | — | — | 25 | 200 |
| 209 | $CeO_2$ | — | — | — | — | — | 16 | 198 |
| 210 | $La_2O_3$ | — | — | — | — | — | 19 | 190 |
| 211 | $Yb_2O_3$ | — | — | — | — | — | 26 | 208 |
| 212 | $MgGd_2O_4$ | — | — | — | — | — | 16 | 212 |
| 213 | $MgY_2O_4$ | — | — | — | — | — | 18 | 190 |
| 214 | $MgLa_2O_4$ | — | — | — | — | — | 26 | 185 |
| 215 | $CaGd_2O_4$ | — | — | — | — | — | 14 | 187 |
| 216 | $CaY_2O_4$ | — | — | — | — | — | 16 | 189 |
| 217 | $CaLa_2O_4$ | — | — | — | — | — | 20 | 192 |
| 218 | $SrGd_2O_4$ | — | — | — | — | — | 22 | 192 |
| 219 | $SrY_2O_4$ | — | — | — | — | — | 27 | 185 |
| 220 | $SrLa_2O_4$ | — | — | — | — | — | 18 | 195 |
| 221 | $BaGd_2O_4$ | — | — | — | — | — | 16 | 202 |
| 222 | $BaY_2O_4$ | — | — | — | — | — | 14 | 201 |
| 223 | $BaLa_2O_4$ | — | — | — | — | — | 24 | 206 |

TABLE 12-continued

| Comparative Example No. | Evaporated material | Modification condition of film body surface | | | | Environment resistance | Breakdown |
| --- | --- | --- | --- | --- | --- | --- | --- |
| | | Temperature (° C.) | Time (min) | Type of gas | Partial pressure of gas | Thickness of fluoride layer (nm) | Thickness of carbonate (nm) | voltage Vf (V) |
| 224 | MaO:LaB$_6$ | — | — | — | — | — | 18 | 188 |
| 225 | MgO:La$_2$O$_3$ | — | — | — | — | — | 14 | 180 |
| 226 | MgO:Sc$_2$O$_3$ | — | — | — | — | — | 16 | 182 |
| 227 | MgO:Y$_2$O$_3$ | — | — | — | — | — | 16 | 186 |

Tables 11 and 12 indicate that in each of Comparative Examples 201 to 227, the thickness of the carbonate layer formed on the film body is as large as 14 to 28 nm, while in each of Examples 201 to 227, the thickness of the carbonate layer is as small as 1 to 5 nm. In Examples 201 to 227, as the thickness of the fluoride layer formed on the surface of the film body increases, the thickness of the carbonate layer decreases.

In Comparative Examples 201 to 227, the breakdown voltages are 176 to 213 V, respectively, while in Examples 201 to 227 corresponding to Comparative Examples 201 to 227, the breakdown voltages are slightly lower values of 155 to 192 V. It is thus found that in Examples of the present invention, the secondary electron emitting ability is high, and thus the performance of PDP is improved.

Comparison Test 6 and Evaluation

In Examples 228 to 250 and Comparative Examples 228 to 250, it was difficult to measure the thickness of the fluoride layers formed on the surfaces of the oxide powder because the oxide powder was fine. Therefore, as a reference, the thickness of a fluoride layer formed on the surface a sputtered film under the same conditions as each of Examples and Comparative Examples was measured by elemental analysis in the depth direction by X-ray photoelectron spectroscopy.

The environment resistance of oxide powder was evaluated by difficulty in changing to the carbonate in the same manner as Comparison Test 5. Specifically, the oxide powder was allowed to stand in air ($CO_2$ concentration: about 300 ppm) at 40° C. and humidity or 90% for 2 weeks, the carbonate layer on the surface of the oxide powder was evaluated by a relative value (a. u.: arbitrary unit) of absorbance at a peak near 1450 cm$^{-1}$ derived from the carbonate in diffuse reflectance infrared spectroscopy (FT-IR). The smaller the relative value of the absorbance, i.e., the thinner the carbonate layer, the more the environment resistance of the oxide powder improves. Furthermore, the breakdown voltage (Vf) of each film body was measured by the same method as Comparison Test 5. The results of measurement are shown in Tables 13 and 14.

TABLE 13

| | Dispersion for film | | Modification condition of oxide powder surface | | | | | Environment resistance | Breakdown voltage |
| --- | --- | --- | --- | --- | --- | --- | --- | --- | --- |
| Example No. | Oxide powder | Binder | Temperature (° C.) | Time (min) | Type of gas | Partial pressure of gas | Thickness of fluoride layer (nm) | Carbonate (a. u.) | Vf (V) |
| 228 | SrO | SrO | 25 | 10 | HF/N$_2$ | 8/752 | 6 | 18 | 183 |
| 229 | BaO | BaO | " | " | " | " | 7 | 16 | 198 |
| 230 | (Ca.Sr)O | (Ca.Sr)O | " | " | " | " | 8 | 25 | 180 |
| 231 | (Mg.Sr)O | (Mg.Sr)O | " | " | " | " | 5 | 17 | 185 |
| 232 | (Sr.Ba)O | (Sr.Ba)O | " | " | " | " | 6 | 18 | 184 |
| 233 | Y$_2$O$_3$ | Y$_2$O$_3$ | " | " | " | " | 4 | 16 | 216 |
| 234 | Gd$_2$O$_3$ | Gd$_2$O$_3$ | " | " | " | " | 5 | 20 | 201 |
| 235 | Dy$_2$O$_3$ | Dy$_2$O$_3$ | " | " | " | " | 6 | 20 | 206 |
| 236 | Dy$_2$O$_3$ | Dy$_2$O$_3$ | " | " | " | " | 8 | 31 | 210 |
| 237 | CeO$_2$ | CeO$_2$ | " | " | " | " | 7 | 32 | 221 |
| 238 | La$_2$O$_2$ | La$_2$O$_3$ | " | " | " | " | 5 | 25 | 209 |
| 239 | MgGd$_2$O$_4$ | MgGd$_2$O$_4$ | " | " | " | " | 4 | 20 | 209 |
| 240 | MgY$_2$O$_4$ | MgY$_2$O$_4$ | " | " | " | " | 3 | 18 | 196 |
| 241 | MgLa$_2$O$_4$ | MgLa$_2$O$_4$ | " | " | " | " | 4 | 25 | 198 |
| 242 | CaGd$_2$O$_4$ | CaGd$_2$O$_4$ | " | " | " | " | 5 | 22 | 195 |
| 243 | CaY$_2$O$_4$ | CaY$_2$O$_4$ | " | " | " | " | 6 | 16 | 193 |
| 244 | CaLa$_2$O$_4$ | CaLa$_2$O$_4$ | " | " | " | " | 8 | 14 | 190 |
| 245 | SrGd$_2$O$_4$ | SrGd$_2$O$_4$ | " | " | " | " | 8 | 26 | 186 |
| 246 | SrY$_2$O$_4$ | SrY$_2$O$_4$ | " | " | " | " | 9 | 20 | 189 |
| 247 | SrLa$_2$O$_4$ | SrLa$_2$O$_4$ | " | " | " | " | 10 | 21 | 194 |
| 248 | BaGd$_2$O$_4$ | BaGd$_2$O$_4$ | " | " | " | " | 11 | 23 | 197 |
| 249 | BaY$_2$O$_4$ | BaY$_2$O$_4$ | " | " | " | " | 7 | 27 | 203 |
| 250 | BaLa$_2$O$_4$ | BaLa$_2$O$_4$ | " | " | " | " | 11 | 19 | 200 |

TABLE 14

| Comp. Example No. | Dispersion for film | | Modification condition of oxide powder surface | | | | Thickness of fluoride layer (nm) | Environment resistance Carbonate (a. u.) | Breakdown voltage Vf (V) |
|---|---|---|---|---|---|---|---|---|---|
| | Oxide powder | Binder | Temperature (° C.) | Time (min) | Type of gas | Partial pressure of gas | | | |
| 228 | SrO | SrO | — | — | — | — | — | 101 | 201 |
| 229 | BaO | BaO | — | — | — | — | — | 103 | 213 |
| 230 | (Ca.Sr)O | (Ca.Sr)O | — | — | — | — | — | 92 | 196 |
| 231 | (Mg.Sr)O | (Mg.Sr)O | — | — | — | — | — | 90 | 190 |
| 232 | (Sr.Ba)O | (Sr.Ba)O | — | — | — | — | — | 106 | 198 |
| 233 | $Y_2O_3$ | $Y_2O_3$ | — | — | — | — | — | 100 | 232 |
| 234 | $Gd_2O_3$ | $Gd_2O_3$ | — | — | — | — | — | 115 | 216 |
| 235 | $Dy_2O_3$ | $Dy_2O_3$ | — | — | — | — | — | 121 | 218 |
| 236 | $DY_2O_3$ | $Dy_2O_3$ | — | — | — | — | — | 130 | 230 |
| 237 | $CeO_2$ | $CeO_2$ | — | — | — | — | — | 140 | 232 |
| 238 | $La_2O_3$ | $La_2O_3$ | — | — | — | — | — | 121 | 240 |
| 239 | $MgGd_2O_4$ | $MgGd_2O_4$ | — | — | — | — | — | 120 | 216 |
| 240 | $MgY_2O_4$ | $MgY_2O_4$ | — | — | — | — | — | 109 | 200 |
| 241 | $MgLa_2O_4$ | $MgLa_2O_4$ | — | — | — | — | — | 98 | 209 |
| 242 | $CaGd_2O_4$ | $CaGd_2O_4$ | — | — | — | — | — | 95 | 212 |
| 243 | $CaY_2O_4$ | $CaY_2O_4$ | — | — | — | — | — | 107 | 210 |
| 244 | $CaLa_2O_4$ | $CaLa_2O_4$ | — | — | — | — | — | 112 | 199 |
| 245 | $SrGd_2O_4$ | $SrGd_2O_4$ | — | — | — | — | — | 96 | 196 |
| 246 | $SrY_2O_4$ | $SrY_2O_4$ | — | — | — | — | — | 89 | 196 |
| 247 | $SrLa_2O_4$ | $SrLa_2O_4$ | — | — | — | — | — | 80 | 200 |
| 248 | $BaGd_2O_4$ | $BaGd_2O_4$ | — | — | — | — | — | 92 | 212 |
| 249 | $BaY_2O_4$ | $BaY_2O_4$ | — | — | — | — | — | 96 | 210 |
| 250 | $BaLa_2O_4$ | $BaLa_2O_4$ | — | — | — | — | — | 108 | 211 |

Tables 13 and 14 indicate that in Comparative Examples 228 to 250, the amounts of carbonate formed on the oxide powder surfaces are as large as 80 to 140, while in Examples 228 to 250, the amounts of carbonate are as small as 14 to 32.

In Comparative Examples 228 to 250, the breakdown voltages are 190 to 240 V, while in Examples 228 to 250 corresponding to Comparative Examples 228 to 250, the breakdown voltages are as low as 180 to 221 V. It is thus found that in Examples of the present invention, the secondary electron emitting ability is high, and thus the performance of PDP is improved.

EXAMPLE 301

First, as shown in FIG. 1, display electrodes (thickness of 5 μm) made of Ag were formed on a front glass substrate having a thickness of 3 mm by screen printing, and then a transparent dielectric layer (thickness of 20 μm) made of glass was formed thereon by screen printing. Next, the glass substrate was dried by maintaining in air at 150° C. for 30 minutes, and then burned by maintaining in air at 550° C. for 30 minutes.

Then, using MgO sintered pellets having a purity of 99.8%, MgO films were deposited in a vacuum by electron beam evaporation to cover the surface of the transparent dielectric layer of the glass substrate, to form the film body. The deposition conditions for the film body included an acceleration voltage of 15 kV, a deposition pressure of $1 \times 10^{-2}$ Pa, and a deposition distance of 600 nm. After the glass substrate was exposed to air, the film body was burned in air at 350° C. for 1 hour together with the glass substrate to activate the film body. The thus-obtained glass substrate was referred to as "Example 301".

EXAMPLE 302

A glass substrate was formed by the same method as Example 301 except that the burning temperature of the film body was 400° C. The thus-obtained glass substrate was referred to as "Example 302".

EXAMPLE 303

A glass substrate was formed by the same method as Example 301 except that the burning temperature of the film body was 450° C. The thus-obtained glass substrate was referred to as "Example 303".

EXAMPLE 304

A glass substrate was formed by the same method as Example 301 except that the burning temperature of the film body was 400° C., and the burning time was 10 minutes. The thus-obtained glass substrate was referred to as "Example 304".

EXAMPLE 305

A glass substrate was formed by the same method as Example 301 except that the burning temperature of the film body was 400° C., and the burning time was 5 hours. The thus-obtained glass substrate was referred to as "Example 305".

EXAMPLE 306

A glass substrate obtained by the same method as Example 304 was maintained in a HF gas atmosphere (temperature 25° C.) at pressure of 38 Torr for 10 minutes to modify the surface of the film body, to form a fluoride layer on the surface of the film body. The thus-obtained glass substrate was referred to as "Example 306".

EXAMPLE 307

A glass substrate was formed by the same method as Example 306 except that the glass substrate was not exposed to air after evaporation, and not activated by heating. The thus-obtained glass substrate was referred to as "Example 307".

COMPARATIVE EXAMPLE 301

A glass substrate was formed by the same method as Example 301 except that the film body was not burned (unburned). The thus-obtained glass substrate was referred to as "Comparative Example 301".

Comparison Test 7 and Evaluation

The glass substrate of each of Examples 301 to 307 and Comparative Example 301 was allowed to stand in air so that an amount of contamination of the film body (mainly, contamination with $H_2O$ and CO, in air) was measured at predetermined time intervals. The amount of contamination was determined by an approximate total amount of the gases exhausted from room temperature to 1000° C., which was measured by monitoring changes in pressure in a vacuum chamber in which each of the glass substrates was heated from room temperature to 1000° C. The results are shown in FIGS. 6 to 8.

Figure 6:
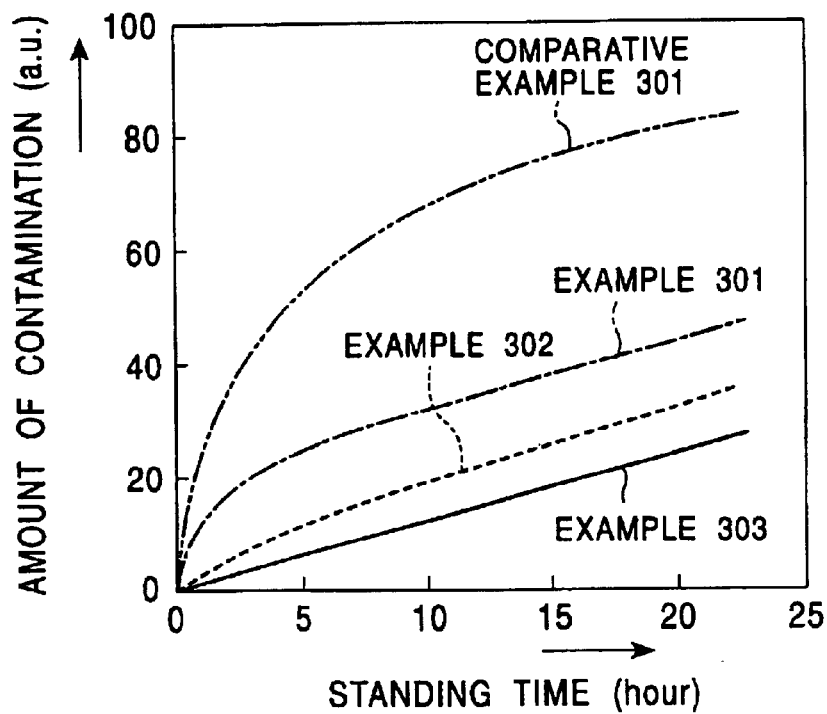
FIG. 6 is a graph showing changes in the amount of contamination of a film body against the time with changes in the heat treatment temperature in Examples 301 to 303 and Comparative Example 301.

FIG. 6 reveals that in Comparative Example 301, the amount of contamination is rapidly increased by allowing the glass substrate to stand in air, while in Examples 301 to 303, the amount of contamination increases a little. It is also found that the amount of contamination in Example 303 having the higher burning temperature less increases than in Example 301 having the lower burning temperature.

Figure 7:
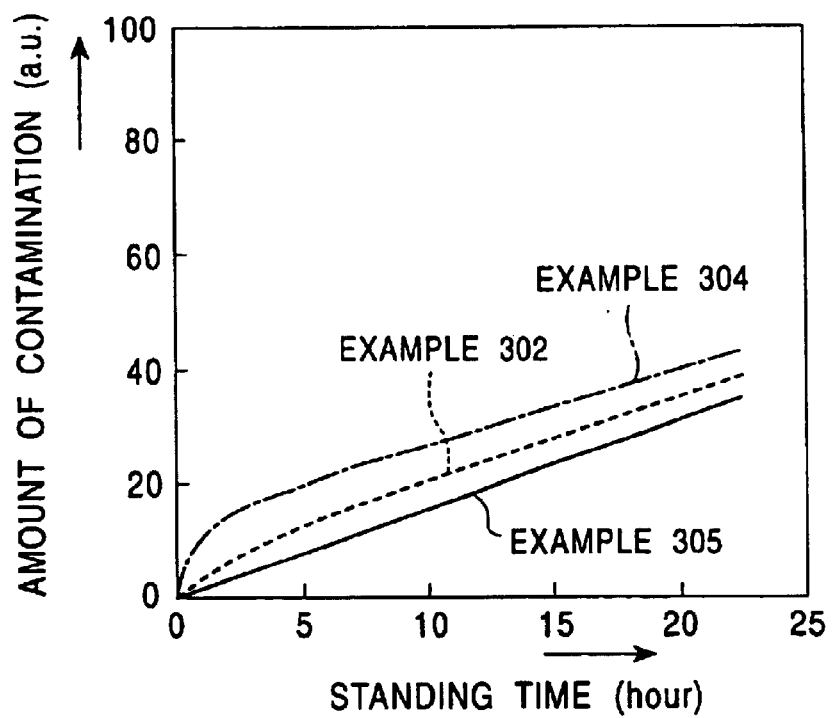
FIG. 7 is a graph showing changes in the amount of contamination of a film body with changes in the heat treatment time in Examples 302, 304 and 305.

FIG. 7 reveals that the amount of contamination in Example 305 having the longer burning time less increases than in Example 304 having the shorter burning time.

Figure 8:
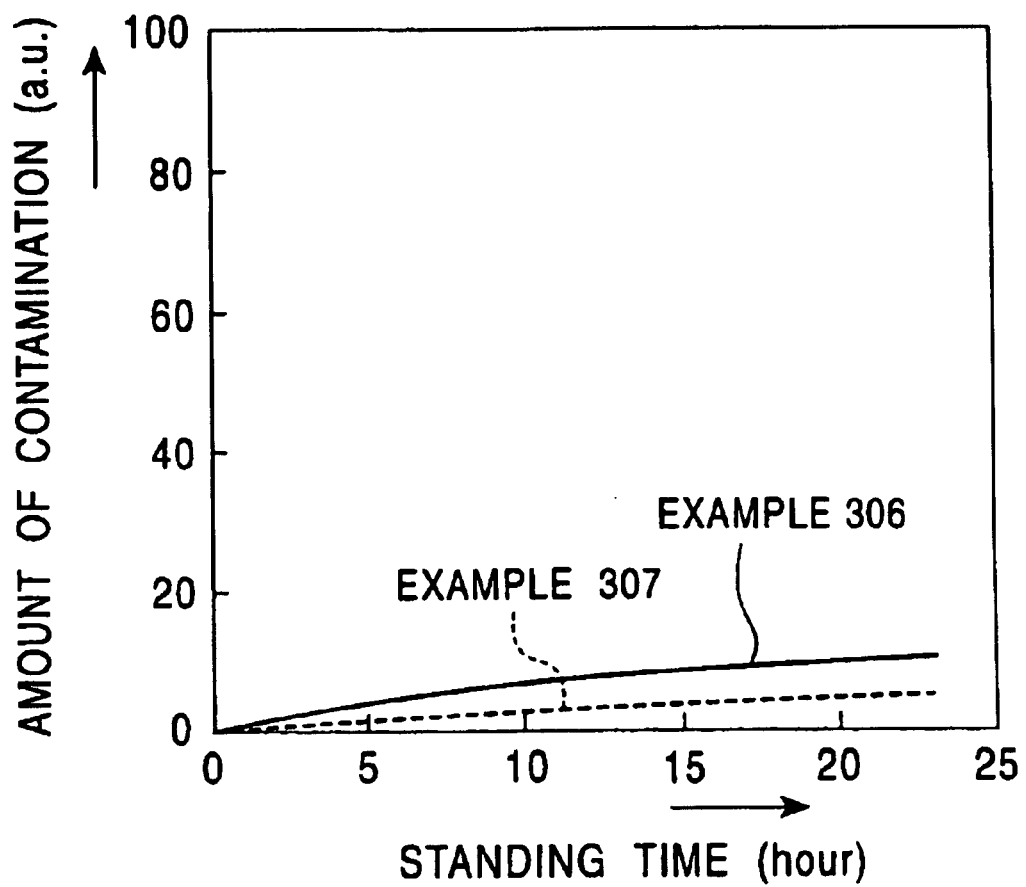
FIG. 8 is a graph showing changes in the amount of contamination of a film body against the time with fluorination in Examples 306 and 307.

FIG. 8 reveals that fluorination significantly decreases the amount of contamination, and fluorination without exposure to air has the higher effect of decreasing contamination.

EXAMPLE 401

First, as shown in FIG. 5, display electrodes (thickness of 5 μm) made of Ag were formed on a front glass substrate having a thickness of 3 mm by screen printing, and then a transparent dielectric layer (thickness of 20 μm) made of glass was formed thereon by screen printing. Next, the glass substrate was dried by maintaining in air at 150° C. for 30 minutes, and then burned by maintaining in air at 550° C. for 30 minutes.

Then, MgO sintered pellets having a purity of 99.8% were deposited in a vacuum by electron beam evaporation to cover the surface of the transparent dielectric layer 17 of the glass substrate, to form a protecting film composed of MgO. The deposition conditions for the protecting film body included an acceleration voltage of 15 kV, a deposition pressure of $1\times10^{-2}$ Pa, and a deposition distance of 600 nm. The glass substrate was maintained in a $F_2$ gas atmosphere (temperature 25° C.) at pressure of 152 Torr for 10 minutes to modify the surface of the protecting film, to form a fluoride layer 55 of the protecting film. The thus-obtained glass substrate was referred to as "Example 401".

EXAMPLE 402

A protecting film was formed on the surface of a glass substrate by electron beam evaporation in the same manner as Example 401, and the glass substrate was then maintained in a $F_2$ gas atmosphere (temperature 25° C.) at pressure of 76 Torr for 10 minutes to modify the surface of the protecting film, to form a fluoride layer on the surface of the protecting film. The thus-obtained glass substrate was referred to as "Example 402".

EXAMPLE 403

A protecting film was formed on the surface of a glass substrate by electron beam evaporation in the same manner as Example 401, and the glass substrate was then maintained in a $F_2$ gas atmosphere (temperature 25° C.) at pressure of 38 Torr for 1 minute to modify the surface of the protecting film, to form a fluoride layer on the surface of the protecting film. The thus-obtained glass substrate was referred to as "Example 403".

EXAMPLE 404

A protecting film was formed on the surface of a glass substrate by electron beam evaporation in the same manner as Example 401, and the glass substrate was then maintained in a $F_2$ gas atmosphere (temperature 25° C.) at pressure of 38 Torr for 10 minutes to modify the surface of the protecting film, to form a fluoride layer on the surface of the protecting film. The thus-obtained glass substrate was referred to as "Example 404".

EXAMPLE 405

A protecting film was formed on the surface of a glass substrate by electron beam evaporation in the same manner as Example 401, and the glass substrate was then maintained in a $F_2$ gas atmosphere (temperature 25° C.) at pressure of 38 Torr for 60 minutes to modify the surface of the protecting film, to form a fluoride layer on the surface of the protecting film. The thus-obtained glass substrate was referred to as "Example 405".

EXAMPLE 406

A protecting film was formed on the surface of a glass substrate by electron beam evaporation in the same manner as Example 401, and the glass substrate was then maintained in a $F_2$ gas atmosphere (temperature 25° C.) at pressure of 7.6 Torr for 10 minutes to modify the surface of the protecting film, to form a fluoride layer on the surface of the protecting film. The thus-obtained glass substrate was referred to as "Example 406".

EXAMPLE 407

A protecting film was formed on the surface of a glass substrate by electron beam evaporation in the same manner as Example 401, and the glass substrate was then maintained in an atmosphere (temperature 25° C.) of a gas mixture containing $F_2$ gas at partial pressure of 7.6 Torr and $N_2$ gas at partial pressure of 752 Torr for 10 minutes to modify the surface of the protecting film, to form a fluoride layer on the surface of the protecting film. The thus-obtained glass substrate was referred to as "Example 407".

EXAMPLE 408

A protecting film was formed on the surface of a glass substrate by electron beam evaporation in the same manner as Example 401, and the glass substrate was then maintained in a $F_2$ gas atmosphere (temperature 100° C.) at pressure 7.6 Torr for 10 minutes to modify the surface of the protecting film, to form a fluoride layer on the surface of the protecting film. The thus-obtained glass substrate was referred to as "Example 408".

EXAMPLE 409

A protecting film was formed on the surface of a glass substrate by electron beam evaporation in the same manner as Example 401, and the glass substrate was then maintained in a HF gas atmosphere (temperature 25° C.) at pressure of 38 Torr for 1 minute to modify the surface of the protecting film, to form a fluoride layer on the surface of the protecting film. The thus-obtained glass substrate was referred to as "Example 409".

EXAMPLE 410

A protecting film was formed on the surface of a glass substrate by electron beam evaporation in the same manner as Example 401, and the glass substrate was then maintained in an atmosphere (temperature 25° C.) of a gas mixture containing HF gas at partial pressure of 7.6 Torr and $N_2$ gas at partial pressure of 752 Torr for 10 minutes to modify the surface of the protecting film, to form a fluoride layer on the surface of the protecting film. The thus-obtained glass substrate was referred to as "Example 410".

EXAMPLE 411

A protecting film was formed on the surface of a glass substrate by electron beam evaporation in the same manner as Example 401, and the glass substrate was then maintained in a $BF_3$ gas atmosphere (temperature 25° C.) at pressure of 7.6 Torr for 10 minutes to modify the surface of the protecting film, to form a fluoride layer on the surface of the protecting film. The thus-obtained glass substrate was referred to as "Example 411".

EXAMPLE 412

A protecting film was formed on the surface of a glass substrate by electron beam evaporation in the same manner as Example 401, and the glass substrate was then maintained in a $SbF_5$ gas atmosphere (temperature 25° C.) at pressure of 7.6 Torr for 10 minutes to modify the surface of the protecting film, to form a fluoride layer on the surface of the protecting film. The thus-obtained glass substrate was referred to as "Example 412".

EXAMPLE 413

A protecting film was formed on the surface of a glass substrate by electron beam evaporation in the same manner as Example 401, and the glass substrate was then maintained in a $SF_6$ gas atmosphere (temperature 25° C.) at pressure of 7.6 Torr for 10 minutes to modify the surface of the protecting film, to form a fluoride layer on the surface of the protecting film. The thus-obtained glass substrate was referred to as "Example 413".

EXAMPLE 414

After a glass substrate with electrodes was formed by the same method as Example 401, a protecting film was formed on the surface of the glass substrate by sputtering using a 5-inch size MgO target having a purity of 99.99% (4N) to cover the surface of the transparent dielectric layer of the glass substrate. The deposition conditions for the protecting film includes a high-frequency output of 1 kW, a sputtering pressure of 1.33 Pa, an oxygen concentration of 10% relatively argon gas, and a substrate temperature of 150° C.

Next, the glass substrate was maintained in a $F_2$ gas atmosphere by the same method as Example 401 to modify the surface of the protecting film, to form a fluoride layer on the surface of the protecting film. The thus-obtained glass substrate was referred to as "Example 414".

EXAMPLE 415

A protecting film was formed on the surface of a glass substrate by sputtering in the same manner as Example 414, and the glass substrate was then maintained in a HF gas atmosphere (temperature 25° C.) at pressure of 38 Torr for 1 minute to modify the surface of the protecting film, to form a fluoride layer on the surface of the protecting film. The thus-obtained glass substrate was referred to as "Example 415".

EXAMPLE 416

First, display electrodes (thickness of 5 μm) made of Ag were formed on a front glass substrate having a thickness of 3 mm by screen printing, and then the transparent dielectric layer (thickness of 20 μm) made of glass was formed thereon by screen printing. Next, 79% by weight of organic acid magnesium (Magnesium Naphthenate, produced by Nihon Kagaku Sangyo Co., ltd.) as a binder containing a MgO component, 2% by weight of ethyl cellulose as a binder containing no MgO component, and 19% by weight of α-terpineol as a solvent were mixed to prepare MgO paste. The thus-prepared MgO paste was coated on the glass substrate by screen printing to form a protecting film.

Next, the glass substrate was dried by maintaining at 150° C. in air for 30 minutes, and then burned by maintaining at 550° C. in air for 30 minutes. Furthermore, the glass substrate was maintained in a $F_2$ gas atmosphere (temperature 25° C.) at pressure of 152 Torr for 10 minutes to modify the surface of the protecting film, to form a fluoride layer on the surface of the protecting film. The thus-formed glass substrate was referred to as "Example 416".

EXAMPLE 417

A protecting film was formed on the surface of a glass substrate by screen printing in the same manner as Example 416, dried and then burned. Then the glass substrate was maintained in a HF gas atmosphere (temperature 25° C.) at pressure of 38 Torr for 1 minute to modify the surface of the protecting, to form a fluoride layer on the surface of the protecting film. The thus-formed glass substrate was referred to as "Example 417".

EXAMPLE 418

5% by weight of MgO powder (produced by Ube Materials) produced by a vapor phase method and having an average particle size of 100 Å, 75% by weight of organic acid magnesium (Magnesium Naphthenate, produced by Nihon Kagaku Sangyo Co., ltd.) and 2% by weight of ethyl cellulose as a binder for a MgO component, and 18% by weight of α-terpineol as a solvent were mixed to prepare MgO paste containing powder. The thus-prepared MgO paste containing powder was used for forming a protecting film on the glass substrate by the same method as Example 416. Furthermore, the surface of the protecting film was modified to form a fluoride layer on the surface thereof. The thus-formed glass substrate was referred to as "Example 418".

EXAMPLE 419

First, display electrodes (thickness of 5 μm) made of Ag were formed on a front glass substrate having a thickness of 3 mm by screen printing, and then a transparent dielectric layer (thickness of 20 μm) made of glass was formed thereon by screen printing. Next, 1.25% by weight of magnesium diethoxide as a binder containing a MgO component and 98.75% by weight of methyl cellosolve as a solvent were mixed to prepare a uniform MgO coating solution. The thus-prepared coating solution was coated on the glass substrate by spin coating to form a protecting film.

Next, the glass substrate was dried by maintaining at 60° C. in air for 30 minutes, and then burned by maintaining at 580° C. in air for 10 minutes. Furthermore, the glass substrate was maintained in a $F_2$ gas atmosphere (temperature 25° C.) at pressure of 152 Torr for 10 minutes to modify the surface of the protecting film, to form a fluoride layer on the surface of the protecting film. The thus-formed glass substrate was referred to as "Example 419".

EXAMPLE 420

A protecting film was formed on the surface of a glass substrate by spin coating in the same manner as Example 419, dried and then burned. Then the glass substrate was maintained in a HF gas atmosphere (temperature 25° C.) at pressure of 38 Torr for 1 minute to modify the surface of the protecting, to form a fluoride layer on the surface of the protecting film. The thus-formed glass substrate was referred to as "Example 420".

EXAMPLE 421

5% by weight of MgO powder (produced by Ube Materials) produced by a vapor phase method and having an average particle size of 100 Å, 1.25% by weight of magnesium diethoxide as a binder for a MgO component, and 93.75% by weight of methyl cellosolve as a solvent were mixed to prepare a uniform MgO coating solution containing powder. The thus-prepared coating solution was used for forming a protecting film on the glass substrate by the same method as Example 419. Furthermore, the surface of the protecting film was modified to form a fluoride layer on the surface thereof. The thus-formed glass substrate was referred to as "Example 421".

EXAMPLE 422

Using CaO sintered pellets having a purity of not less than 99.5%, CaO films were deposited by electron beam evaporation to cover the surface of a transparent dielectric layer 17 of a glass substrate to form a protecting film by the same method as Example 401. The glass substrate was further maintained in a HF gas atmosphere (temperature 25° C.) at pressure of 38 Torr for 1 minute to modify the surface of the protecting film by the same method as Example 409, to form a fluoride layer on the surface of the protecting film. The thus-formed glass substrate was referred to as "Example 422".

EXAMPLE 423

A protecting film composed of SrO was formed by the same method as Example 422 except that SrO sintered pellets having a purity of not less than 99.5% were used, and the surface of the protecting film was modified by the same method as Example 422 to form a fluoride layer on the surface of the protecting film. The thus-formed glass substrate was referred to as "Example 423".

EXAMPLE 424

A protecting film composed of BaO was formed by the same method as Example 422 except that BaO sintered pellets having a purity of not less than 99.5% were used, and the surface of the protecting film was modified by the same method as Example 422 to form a fluoride layer on the surface of the protecting film. The thus-formed glass substrate was referred to as "Example 424".

EXAMPLE 425

A protecting film composed of (Ca.Sr)O was formed by the same method as Example 422 except that (Ca.Sr)O sintered pellets having a purity of not less than 99.5% were used, and the surface of the protecting film was modified by the same method as Example 422 to form a fluoride layer on the surface of the protecting film. The thus-formed glass substrate was referred to as "Example 425".

EXAMPLE 426

A protecting film composed of (Mg.Sr)O was formed by the same method as Example 422 except that (Mg.Sr)O sintered pellets having a purity of not less than 99.5% were used, and the surface of the protecting film was modified by the same method as Example 422 to form a fluoride layer on the surface of the protecting film. The thus-formed glass substrate was referred to as "Example 426".

EXAMPLE 427

A protecting film composed of (Sr.Ba)O was formed by the same method as Example 422 except that (Sr.Ba)O sintered pellets having a purity of not less than 99.5% were used, and the surface of the protecting film was modified by the same method as Example 422 to form a fluoride layer on the surface of the protecting film. The thus-formed glass substrate was referred to as "Example 427".

EXAMPLE 428

A protecting film composed of $Y_2O_3$ was formed by the same method as Example 422 except that $Y_2O_3$ sintered pellets having a purity of not less than 99.5% were used, and the surface of the protecting film was modified by the same method as Example 422 to form a fluoride layer on the surface of the protecting film. The thus-formed glass substrate was referred to as "Example 428".

EXAMPLE 429

A protecting film composed of $Gd_2O_3$ was formed by the same method as Example 422 except that $Gd_2O_3$ sintered pellets having a purity of not less than 99.5% were used, and the surface of the protecting film was modified by the same method as Example 422 to form a fluoride layer on the surface of the protecting film. The thus-formed glass substrate was referred to as "Example 429".

EXAMPLE 430

A protecting film composed of $Dy_2O_3$ was formed by the same method as Example 422 except that $Dy_2O_3$ sintered pellets having a purity of not less than 99.5% were used, and the surface of the protecting film was modified by the same method as Example 422 to form a fluoride layer on the surface of the protecting film. The thus-formed glass substrate was referred to as "Example 430".

EXAMPLE 431

A protecting film composed of $CeO_2$ was formed by the same method as Example 422 except that $CeO_2$ sintered pellets having a purity of not less than 99.5% were used, and the surface of the protecting film was modified by the same method as Example 422 to form a fluoride layer on the surface of the protecting film. The thus-formed glass substrate was referred to as "Example 431".

EXAMPLE 432

A protecting film composed of $La_2O_3$ was formed by the same method as Example 422 except that $La_2O_3$ sintered pellets having a purity of not less than 99.5% were used, and the surface of the protecting film was modified by the same method as Example 422 to form a fluoride layer on the surface of the protecting film. The thus-formed glass substrate was referred to as "Example 432".

EXAMPLE 433

A protecting film composed of $Yb_2O_3$ was formed by the same method as Example 422 except that $Yb_2O_3$ sintered pellets having a purity of not less than 99.5% were used, and the surface of the protecting film was modified by the same method as Example 422 to form a fluoride layer on the surface of the protecting film. The thus-formed glass substrate was referred to as "Example 433".

EXAMPLE 434

A protecting film composed of $MgGd_2O_4$ was formed by the same method as Example 422 except that $MgGd_2O_4$ sintered pellets having a purity of not less than 99.5% were used, and the surface of the protecting film was modified by the same method as Example 422 to form a fluoride layer on the surface of the protecting film. The thus-formed glass substrate was referred to as "Example 434".

EXAMPLE 435

A protecting film composed of $MgY_2O_4$ was formed by the same method as Example 422 except that $MgY_2O$, sintered pellets having a purity of not less than 99.5% were used, and the surface of the protecting film was modified by the same method as Example 422 to form a fluoride layer on the surface of the protecting film. The thus-formed glass substrate was referred to as "Example 435".

EXAMPLE 436

A protecting film composed of $MgLa_2O_4$ was formed by the same method as Example 422 except that $MgLa_2O_4$ sintered pellets having a purity of not less than 99.5% were used, and the surface of the protecting film was modified by the same method as Example 422 to form a fluoride layer on the surface of the protecting film. The thus-formed glass substrate was referred to as "Example 436".

EXAMPLE 437

A protecting film composed of $CaGd_2O_4$ was formed by the same method as Example 422 except that $CaGd_2O_4$ sintered pellets having a purity of not less than 99.5% were used, and the surface of the protecting film was modified by the same method as Example 422 to form a fluoride layer on the surface of the protecting film. The thus-formed glass substrate was referred to as "Example 437".

EXAMPLE 438

A protecting film composed of $CaY_2O_4$ was formed by the same method as Example 422 except that $CaY_2O_4$ sintered pellets having a purity of not less than 99.5% were used, and the surface of the protecting film was modified by the same method as Example 422 to form a fluoride layer on the surface of the protecting film. The thus-formed glass substrate was referred to as "Example 438".

EXAMPLE 439

A protecting film composed of $CaLa_2O_7$ was formed by the same method as Example 422 except that $CaLa_2O_4$ sintered pellets having a purity of not less than 99.5% were used, and the surface of the protecting film was modified by the same method as Example 422 to form a fluoride layer on the surface of the protecting film. The thus-formed glass substrate was referred to as "Example 439".

EXAMPLE 440

A protecting film composed of $SrGd_2O_4$ was formed by the same method as Example 422 except that $SrGd_2O_4$ sintered pellets having a purity of not less than 99.5% were used, and the surface of the protecting film was modified by the same method as Example 422 to form a fluoride layer on the surface of the protecting film. The thus-formed glass substrate was referred to as "Example 440".

EXAMPLE 441

A protecting film composed of $SrY_2O_4$ was formed by the same method as Example 422 except that $SrY_2O_4$ sintered pellets having a purity of not less than 99.5% were used, and the surface of the protecting film was modified by the same method as Example 422 to form a fluoride layer on the surface of the protecting film. The thus-formed glass substrate was referred to as "Example 441".

EXAMPLE 442

A protecting film composed of $SrLa_2O_4$ was formed by the same method as Example 422 except that $SrLa_2O_4$ sintered pellets having a purity of not less than 99.5% were used, and the surface of the protecting film was modified by the same method as Example 422 to form a fluoride layer on the surface of the protecting film. The thus-formed glass substrate was referred to as "Example 442".

EXAMPLE 443

A protecting film composed of $BaGd_2O_4$ was formed by the same method as Example 422 except that $BaGd_2O_4$ sintered pellets having a purity of not less than 99.5% were used, and the surface of the protecting film was modified by the same method as Example 422 to form a fluoride layer on the surface of the protecting film. The thus-formed glass substrate was referred to as "Example 443".

EXAMPLE 444

A protecting film composed of $BaY_2O_4$ was formed by the same method as Example 422 except that $BaY_2O$, sintered pellets having a purity of not less than 99.5% were used, and the surface of the protecting film was modified by the same method as Example 422 to form a fluoride layer on the surface of the protecting film. The thus-formed glass substrate was referred to as "Example 444".

EXAMPLE 445

A protecting film composed of $BaLa_2O_4$ was formed by the same method as Example 422 except that $BaLa_2O_4$ sintered pellets having a purity of not less than 99.5% were used, and the surface of the protecting film was modified by the same method as Example 422 to form a fluoride layer on the surface of the protecting film. The thus-formed glass substrate was referred to as "Example 445".

EXAMPLE 446

A protecting film composed of $MaO:LaB_6$ was formed by the same method as Example 422 except that $MaO:LaB_6$ sintered pellets having a purity of not less than 99.5% were used, and the surface of the protecting film was modified by the same method as Example 422 to form a fluoride layer on the surface of the protecting film. The thus-formed glass substrate was referred to as "Example 446".

EXAMPLE 447

A protecting film composed of MaO:$La_2O_3$ was formed by the same method as Example 422 except that MgO:$La_2O_3$ sintered pellets having a purity of not less than 99.5% were used, and the surface of the protecting film was modified by the same method as Example 422 to form a fluoride layer on the surface of the protecting film. The thus-formed glass substrate was referred to as "Example 447".

EXAMPLE 448

A protecting film composed of MaO:$Sc_2O_3$ was formed by the same method as Example 422 except that MgO:$Sc_2O_3$ sintered pellets having a purity of not less than 99.5% were used, and the surface of the protecting film was modified by the same method as Example 422 to form a fluoride layer on the surface of the protecting film. The thus-formed glass substrate was referred to as "Example 448".

EXAMPLE 449

A protecting film composed of MaO:$Y_2O_3$ was formed by the same method as Example 422 except that MgO:$Y_2O_3$ sintered pellets having a purity of not less than 99.5% were used, and the surface of the protecting film was modified by the same method as Example 422 to form a fluoride layer on the surface of the protecting film. The thus-formed glass substrate was referred to as "Example 449".

COMPARATIVE EXAMPLE 401

A protecting film was formed on the surface of a glass substrate by electron beam evaporation in same manner as Example 401 except that the surface of the protecting film was not modified. The thus-formed glass substrate was referred to as "Comparative Example 401".

COMPARATIVE EXAMPLE 402

A protecting film was formed on the surface of a glass substrate by sputtering in same manner as Example 414 except that the surface of the protecting film was not modified. The thus-formed glass substrate was referred to as "Comparative Example 402".

COMPARATIVE EXAMPLE 403

A protecting film was formed on the surface of a glass substrate by screen printing, dried and then burned in same manner as Example 416 except that the surface of the protecting film was not modified. The thus-formed glass substrate was referred to as "Comparative Example 403".

COMPARATIVE EXAMPLE 404

A protecting film was formed on the surface of a glass substrate by screen printing, dried and then burned in same manner as Example 418 except that the surface of the protecting film was not modified. The thus-formed glass substrate was referred to as "Comparative Example 404".

COMPARATIVE EXAMPLE 405

A protecting film was formed on the surface of a glass substrate by spin coating, dried and then burned in same manner as Example 419 except that the surface of the protecting film was not modified. The thus-formed glass substrate was referred to as "Comparative Example 405".

COMPARATIVE EXAMPLE 406

A protecting film was formed on the surface of a glass substrate by spin coating, dried and then burned in same manner as Example 421 except that the surface of the protecting film was not modified. The thus-formed glass substrate was referred to as "Comparative Example 406".

COMPARATIVE EXAMPLE 407

CaO sintered pellets having a purity of not less than 99.5% were deposited by electron beam evaporation to cover the surface of a transparent dielectric layer of a glass substrate to form a protecting film composed of CaO by the same method as Example 401 except that the surface of the protecting film was not modified. The thus-formed glass substrate was referred to as "Comparative Example 407".

COMPARATIVE EXAMPLE 408

A protecting film composed of SrO was formed by the same method as Comparative Example 407 except that SrO sintered pellets having a purity of not less than 99.5% were used, to form a glass substrate. The thus-formed glass substrate was referred to as "Comparative Example 408".

COMPARATIVE EXAMPLE 409

A protecting film composed of BaO was formed by the same method as Comparative Example 407 except that BaO sintered pellets having a purity of not less than 99.5% were used, to form a glass substrate. The thus-formed glass substrate was referred to as "Comparative Example 409".

COMPARATIVE EXAMPLE 410

A protecting film composed of (Ca.Sr)O was formed by the same method as Comparative Example 407 except that (Ca.Sr)O sintered pellets having a purity of not less than 99.5% were used, to form a glass substrate. The thus-formed glass substrate was referred to as "Comparative Example 410".

COMPARATIVE EXAMPLE 411

A protecting film composed of (Mg.Sr)O was formed by the same method as Comparative Example 407 except that (Mg.Sr)O sintered pellets having a purity of not less than 99.5% were used, to form a glass substrate. The thus-formed glass substrate was referred to as "Comparative Example 411".

COMPARATIVE EXAMPLE 412

A protecting film composed of (Sr.Ba)O was formed by the same method as Comparative Example 407 except that (Sr.Ba)O sintered pellets having a purity of not less than 99.5% were used, to form a glass substrate. The thus-formed glass substrate was referred to as "Comparative Example 412".

COMPARATIVE EXAMPLE 413

A protecting film composed of $Y_2O_3$ was formed by the same method as Comparative Example 407 except that $Y_2O_3$ sintered pellets having a purity of not less than 99.5% were used, to form a glass substrate. The thus-formed glass substrate was referred to as "Comparative Example 413".

COMPARATIVE EXAMPLE 414

A protecting film composed of $Gd_2O_3$ was formed by the same method as Comparative Example 407 except that $Gd_2O_3$ sintered pellets having a purity of not less than 99.5% were used, to form a glass substrate. The thus-formed glass substrate was referred to as "Comparative Example 414".

COMPARATIVE EXAMPLE 415

A protecting film composed of $Dy_2O_3$ was formed by the same method as Comparative Example 407 except that $Dy_2O_3$ sintered pellets having a purity of not less than 99.5% were used, to form a glass substrate. The thus-formed glass substrate was referred to as "Comparative Example 415".

COMPARATIVE EXAMPLE 416

A protecting film composed of $CeO_2$ was formed by the same method as Comparative Example 407 except that $CeO_2$ sintered pellets having a purity of not less than 99.5% were used, to form a glass substrate. The thus-formed glass substrate was referred to as "Comparative Example 416".

COMPARATIVE EXAMPLE 417

A protecting film composed of $La_2O_3$ was formed by the same method as Comparative Example 407 except that $La_2O_3$ sintered pellets having a purity of not less than 99.5% were used, to form a glass substrate. The thus-formed glass substrate was referred to as "Comparative Example 417".

COMPARATIVE EXAMPLE 418

A protecting film composed of $Yb_2O_3$ was formed by the same method as Comparative Example 407 except that $Yb_2O_3$ sintered pellets having a purity of not less than 99.5% were used, to form a glass substrate. The thus-formed glass substrate was referred to as "Comparative Example 418".

COMPARATIVE EXAMPLE 419

A protecting film composed of $MgGd_2O_4$ was formed by the same method as Comparative Example 407 except that $MgGd_2O_4$ sintered pellets having a purity of not less than 99.5% were used, to form a glass substrate. The thus-formed glass substrate was referred to as "Comparative Example 419".

COMPARATIVE EXAMPLE 420

A protecting film composed of $MgY_2O_4$ was formed by the same method as Comparative Example 407 except that $MgY_2O_4$ sintered pellets having a purity of not less than 99.5% were used, to form a glass substrate. The thus-formed glass substrate was referred to as "Comparative Example 420".

COMPARATIVE EXAMPLE 421

A protecting film composed or $MgLa_2O_4$ was formed by the same method as Comparative Example 407 except that $MgLa_2O_4$ sintered pellets having a purity of not less than 99.5% were used, to form a glass substrate. The thus-formed glass substrate was referred to as "Comparative Example 421".

COMPARATIVE EXAMPLE 422

A protecting film composed of $CaGd_2O_4$ was formed by the same method as Comparative Example 407 except that $CaGd_2O_4$ sintered pellets having a purity of not less than 99.5% were used, to form a glass substrate. The thus-formed glass substrate was referred to as "Comparative Example 422".

COMPARATIVE EXAMPLE 423

A protecting film composed of $CaY_2O_4$ was formed by the same method as Comparative Example 407 except that $CaY_2O_4$ sintered pellets having a purity of not less than 99.5% were used, to form a glass substrate. The thus-formed glass substrate was referred to as "Comparative Example 423".

COMPARATIVE EXAMPLE 424

A protecting film composed of $CaLa_2O_4$ was formed by the same method as Comparative Example 407 except that $CaLa_2O_4$ sintered pellets having a purity of not less than 99.5% were used, to form a glass substrate. The thus-formed glass substrate was referred to as "Comparative Example 424".

COMPARATIVE EXAMPLE 425

A protecting film composed of $SrGd_2O_4$ was formed by the same method as Comparative Example 407 except that $SrGd_2O_4$ sintered pellets having a purity of not less than 99.5% were used, to form a glass substrate. The thus-formed glass substrate was referred to as "Comparative Example 425".

COMPARATIVE EXAMPLE 426

A protecting film composed of $SrY_2O_4$ was formed by the same method as Comparative Example 407 except that $SrY_2O$, sintered pellets having a purity of not less than 99.5% were used, to form a glass substrate. The thus-formed glass substrate was referred to as "Comparative Example 426".

COMPARATIVE EXAMPLE 427

A protecting film composed of $SrLa_2O_4$ was formed by the same method as Comparative Example 407 except that $SrLa_2O_4$ sintered pellets having a purity of not less than 99.5% were used, to form a glass substrate. The thus-formed glass substrate was referred to as "Comparative Example 427".

COMPARATIVE EXAMPLE 428

A protecting film composed of $BaGd_2O_4$ was formed by the same method as Comparative Example 407 except that $BaGd_2O_4$ sintered pellets having a purity of not less than 99.5% were used, to form a glass substrate. The thus-formed glass substrate was referred to as "Comparative Example 428".

COMPARATIVE EXAMPLE 429

A protecting film composed of $BaY_2O_4$ was formed by the same method as Comparative Example 407 except that $BaY_2O_4$ sintered pellets having a purity of not less than 99.5% were used, to form a glass substrate. The thus-formed glass substrate was referred to as "Comparative Example 429".

COMPARATIVE EXAMPLE 430

A protecting film composed of $BaLa_2O_4$ was formed by the same method as Comparative Example 407 except that $BaLa_2O_4$ sintered pellets having a purity of not less than 99.5% were used, to form a glass substrate. The thus-formed glass substrate was referred to as "Comparative Example 430".

COMPARATIVE EXAMPLE 431

A protecting film composed of $MgO:LaB_6$ was formed by the same method as Comparative Example 407 except that $MgO:LaB_6$ sintered pellets having a purity of not less than 99.5% were used, to form a glass substrate. The thus-formed glass substrate was referred to as "Comparative Example 431".

COMPARATIVE EXAMPLE 432

A protecting film composed of $MgO:La_2O_3$ was formed by the same method as Comparative Example 407 except that $MgO:La_2O_3$ sintered pellets having a purity of not less than 99.5% were used, to form a glass substrate. The thus-formed glass substrate was referred to as "Comparative Example 432".

COMPARATIVE EXAMPLE 433

A protecting film composed of $MgO:Sc_2O_3$ was formed by the same method as Comparative Example 407 except that $MgO:Sc_2O_3$ sintered pellets having a purity of not less than 99.5% were used, to form a glass substrate. The thus-formed glass substrate was referred to as "Comparative Example 433".

COMPARATIVE EXAMPLE 434

A protecting film composed of $MgO:Y_2O_3$ was formed by the same method as Comparative Example 407 except that $MgO:Y_2O_3$ sintered pellets having a purity of not less than 99.5% were used, to form a glass substrate. The thus-formed glass substrate was referred to as "Comparative Example 434".

Comparison Test 8 and Evaluation

In each of Examples 401 to 449, the thickness of the fluoride layer formed on the surface of the protecting film on the front glass substrate was measured by elemental analysis in the depth direction by X-ray photoelectron spectroscopy.

In each of Examples 401 to 449 and Comparative Examples 401 to 434, the environment resistance of the protecting films was measured by the same method as Comparison Test 1.

In each of Examples 401 to 449 and Comparative Examples 401 to 434, the breakdown voltage (Vf) of the protecting film was measured as follows:

In Examples 401 to 449, the glass substrate was first incorporated in PDP, a removal discharge gas (gas containing $CF_4$) was injected in each of the discharge cells of the PDP, and then plane discharge was started between the display electrodes to remove the fluoride layer by etching due to the discharge. After the removal discharge gas was exhausted, the panel was filled with a gas mixture of He and 2% Xe at 400 Torr as a display discharge gas. In this state, an AC voltage of 10 kHz was applied between the display electrodes to measure the breakdown voltage.

In Comparative Examples 401 to 434, the glass substrate was first incorporated in PDP, and each of the discharge cells of the PDP was filled with a gas mixture of He and 2% Xe at 400 Torr as a display discharge gas. In this state, an AC voltage of 10 kHz was applied between the display electrodes to measure the breakdown voltage.

The results of measurement are shown in Tables 15 to 19.

TABLE 15

| | Modification condition of film body (MgO) surface | | | | | Environment resistance | Breakdown |
| | | | Type and partial pressure of gas | | | Thickness of | Thickness of | voltage |
| Example No. | Temperature (° C.) | Time (min) | Gas | Partial pressure | Gas | Partial pressure | fluoride layer (nm) | carbonate (nm) | Vf (V) |
|---|---|---|---|---|---|---|---|---|---|
| 401 | 25 | 10 | $F_2$ | 152 | — | — | 24 | 1 | 156 |
| 402 | 25 | 10 | $F_2$ | 76 | — | — | 16 | 1 | 154 |
| 403 | 25 | 1 | $F_2$ | 38 | — | — | 10 | 3 | 160 |
| 404 | 25 | 10 | $F_2$ | 38 | — | — | 15 | 1 | 152 |
| 405 | 25 | 60 | $F_2$ | 38 | — | — | 30 | 1 | 156 |
| 406 | 25 | 10 | $F_2$ | 7.6 | — | — | 5 | 7 | 166 |
| 407 | 25 | 10 | $F_2$ | 7.6 | $N_2$ | 752 | 6 | 10 | 165 |
| 408 | 100 | 10 | $F_2$ | 7.6 | — | — | 22 | 1 | 152 |
| 409 | 25 | 1 | HF | 38 | — | — | 5 | 12 | 166 |
| 410 | 25 | 10 | HF | 7.6 | $N_2$ | 752 | 2 | 15 | 168 |
| 411 | 25 | 10 | $BF_3$ | 7.6 | — | — | 4 | 10 | 163 |
| 412 | 25 | 10 | $SbF_5$ | 7.6 | — | — | 5 | 7 | 159 |
| 413 | 25 | 10 | $SF_4$ | 7.6 | — | — | 2 | 11 | 165 |
| 414 | 25 | 10 | $F_2$ | 152 | — | — | 10 | 1 | 151 |
| 415 | 25 | 1 | HF | 38 | — | — | 2 | 7 | 156 |
| 416 | 25 | 10 | $F_2$ | 152 | — | — | 36 | 2 | 170 |
| 417 | 25 | 1 | HF | 38 | — | — | 6 | 15 | 178 |
| 418 | 25 | 10 | $F_2$ | 152 | — | — | 420 | 5 | 171 |
| 419 | 25 | 10 | $F_2$ | 152 | — | — | 42 | 2 | 173 |
| 420 | 25 | 1 | HF | 38 | — | — | 6 | 18 | 180 |
| 421 | 25 | 10 | $F_2$ | 152 | — | — | 510 | 7 | 178 |

TABLE 16

| Example No. | Type of sintered pellets | Modification condition of protecting film surface | | | | Thickness of fluoride layer (nm) | Environment resistance Thickness of carbonate (nm) | Breakdown voltage Vf (V) |
|---|---|---|---|---|---|---|---|---|
| | | Temperature (° C.) | Time (min) | Type of gas | Partial pressure of gas | | | |
| 422 | CaO | 25 | 1 | HF | 38 | 10 | 8 | 170 |
| 423 | SrO | | | | | 16 | 1 | 156 |
| 424 | BaO | | | | | 15 | 1 | 161 |
| 425 | (Ca.Sr)O | | | | | 12 | 2 | 151 |
| 426 | (Mg.Sr)O | | | | | 10 | 2 | 150 |
| 427 | (Sr.Ba)O | | | | | 16 | 1 | 154 |
| 428 | $Y_2O_3$ | | | | | 8 | 2 | 190 |
| 429 | $Gd_2O_3$ | | | | | 6 | 1 | 183 |
| 430 | $Dy_2O_3$ | | | | | 5 | 2 | 180 |
| 431 | $CeO_2$ | | | | | 10 | 2 | 183 |
| 432 | $La_2O_3$ | | | | | 7 | 4 | 171 |
| 433 | $Yb_2O_3$ | | | | | 7 | 3 | 173 |
| 434 | $MgGd_2O_4$ | | | | | 7 | 3 | 180 |
| 435 | $MgY_2O_4$ | | | | | 8 | 3 | 173 |

TABLE 17

| Example No. | Type of sintered pellets | Modification condition of protecting film surface | | | | Thickness of fluoride layer (nm) | Environment resistance Thickness of carbonate (nm) | Breakdown voltage Vf (V) |
|---|---|---|---|---|---|---|---|---|
| | | Temperature (° C.) | Time (min) | Type of gas | Partial pressure of gas | | | |
| 436 | $MgLa_2O_4$ | 25 | 1 | HF | 38 | 6 | 2 | 170 |
| 437 | $CaGd_2O_4$ | | | | | 5 | 1 | 183 |
| 438 | $CaY_2O_4$ | | | | | 7 | 1 | 177 |
| 439 | $CaLa_2O_4$ | | | | | 9 | 2 | 177 |
| 440 | $SrGd_2O_4$ | | | | | 10 | 4 | 164 |
| 441 | $SrY_2O_4$ | | | | | 10 | 4 | 163 |
| 442 | $SrLa_2O_4$ | | | | | 12 | 3 | 170 |
| 443 | $BaGd_2O_4$ | | | | | 15 | 3 | 171 |
| 444 | $BaY_2O_4$ | | | | | 18 | 1 | 175 |
| 445 | $BaLa_2O_4$ | | | | | 16 | 1 | 171 |
| 446 | MaO:LaB6 | | | | | 10 | 2 | 155 |
| 447 | $MgO:La_2O_3$ | | | | | 8 | 4 | 156 |
| 448 | $MgO:Sc_2O_2$ | | | | | 12 | 5 | 153 |
| 449 | $MgO:Y_2O_3$ | | | | | 12 | 2 | 153 |

TABLE 18

| Comparative Example No. | Type of sintered pellets | Modification condition of protecting film surface | | | | Thickness of fluoride layer (nm) | Environment resistance Thickness of carbonate (nm) | Breakdown voltage Vf (V) |
|---|---|---|---|---|---|---|---|---|
| | | Temperature (° C.) | Time (min) | Type of gas | Partial pressure of gas | | | |
| 401 | MgO | — | — | — | — | Untreated | 17 | 172 |
| 402 | MgO | | | | | | 10 | 165 |
| 403 | MgO | | | | | | 22 | 196 |
| 404 | MgO | | | | | | 510 | 201 |
| 405 | MgO | | | | | | 30 | 195 |
| 406 | MgO | | | | | | 560 | 200 |
| 407 | CaO | | | | | | 20 | 180 |
| 408 | SrO | | | | | | 22 | 185 |
| 409 | BaO | | | | | | 28 | 186 |
| 410 | (Ca.Sr)O | | | | | | 25 | 179 |
| 411 | (Mg.Sr)O | | | | | | 22 | 176 |
| 412 | (Sr.Ba)O | | | | | | 25 | 191 |
| 413 | $Y_2O_3$ | | | | | | 18 | 213 |
| 414 | $Gd_2O_3$ | | | | | | 20 | 206 |
| 415 | $Dy_2O_3$ | | | | | | 25 | 200 |
| 416 | $CeO_2$ | | | | | | 16 | 198 |
| 417 | $La_2O_3$ | | | | | | 19 | 190 |

TABLE 19

| Comparative Example No. | Type of sintered pellets | Modification condition of protecting film surface | | | | Thickness of fluoride layer (nm) | Environment resistance Thickness of carbonate (nm) | Breakdown voltage Vf (V) |
|---|---|---|---|---|---|---|---|---|
| | | Temperature (° C.) | Time (min) | Type of gas | Partial pressure of gas | | | |
| 418 | Yb$_2$O$_3$ | — | — | — | — | Untreated | 26 | 208 |
| 419 | MgGd$_2$O$_4$ | | | | | | 16 | 212 |
| 420 | MgY$_2$O$_4$ | | | | | | 18 | 190 |
| 421 | MgLa$_2$O$_4$ | | | | | | 26 | 185 |
| 422 | CaGd$_2$O$_4$ | | | | | | 14 | 187 |
| 423 | CaY$_2$O$_4$ | | | | | | 16 | 189 |
| 424 | CaLa$_2$O$_4$ | | | | | | 20 | 192 |
| 425 | SrGd$_2$O$_4$ | | | | | | 22 | 192 |
| 426 | SrY$_2$O$_4$ | | | | | | 27 | 185 |
| 427 | SrLa$_2$O$_4$ | | | | | | 18 | 195 |
| 428 | BaGd$_2$O$_4$ | | | | | | 16 | 202 |
| 429 | BaY$_2$O$_4$ | | | | | | 14 | 201 |
| 430 | BaLa$_2$O$_4$ | | | | | | 24 | 206 |
| 431 | MaO:LaB$_6$ | | | | | | 18 | 188 |
| 432 | MgO:La$_2$O$_3$ | | | | | | 14 | 180 |
| 433 | MgO:Sc$_2$O$_3$ | | | | | | 16 | 182 |
| 434 | MgO:Y$_2$O$_3$ | | | | | | 16 | 186 |

Tables 15 to 19 indicate that in each of Comparative Examples 401 to 403, 405, and 407 to 434, the thickness of the carbonate (MgCO$_3$) formed on the film body is as large as 10 to 30 nm, and in each of Comparative Examples 404 and 406, the carbonate (MgCO$_3$) is formed over substantially the entire protecting film. On the other hand, in each of Examples 401 to 449, the thickness of the carbonate is as small as 1 to 18 nm. It is also found that as the thickness of the fluoride layer formed on the surface of the protecting film increases, the thickness of the carbonate layer decreases.

In Comparative Examples 401 and 402, the breakdown voltages are 172 and 165 V, respectively, while in Examples 401 to 415 corresponding to Comparative Examples 401 and 402, the breakdown voltages are slightly lower values of 151 to 168 V. In Comparative Examples 403 to 406, the breakdown voltages are 195 to 201 V, while in Examples 416 to 421 corresponding to Comparative Examples 403 to 406, the breakdown voltages are as low as 170 to 180 V. In Comparative Examples 407 to 434, the breakdown voltages are 176 to 213 V, while in Examples 422 to 449 corresponding to Comparative Examples 407 to 434, the breakdown voltages are as low as 150 to 190 V. It is thus found that In Examples of the present invention, the secondary electron emitting ability is high, and thus the performance of PDP is improved.

As described above, in the present invention, a film body is formed on the surface of a substrate, and a fluoride layer is further formed on the surface of the film body. Therefore, even when a protecting film is exposed to air for a long time during the process for manufacturing FPD, MgO or the like in the film body little reacts with CO$_2$ gas and H$_2$O gas in air. As a result, MgO or the like is little degenerated to MgCO$_3$ and Mg(OH)$_2$, etc. which have the probability of deteriorating the function of FPD, thereby improving the environment resistance of the film body.

Since the film body of the protecting film, which has substantially the same thermal expansion coefficient as the substrate, is bonded to the substrate, the protecting film is not separated from the substrate due to a thermal cycle, and adhesion and matching between the protecting film and the substrate are significantly improved.

In the protecting film comprising the film body formed on the surface of the substrate by using a MgO powder or the like coated with a fluoride layer, even when the protecting film is exposed to air for a long time during the process for manufacturing FPD, MgO or the like in the film body little reacts with CO$_2$ gas and H$_2$O gas in air. As a result, MgO or the like is little degenerated to MgCO$_3$ and Mg(OH)$_2$, etc. which have the probability of deteriorating the function of FPD, thereby improving the environment resistance of the film body. In addition, since the fluoride layers coated on the surfaces of the MgO powder or the like are very thin, the MgO powder or the like has substantially the same mechanical properties as a MgO powder or the like with no fluoride layer coated on the surfaces thereof.

Furthermore, where the fluoride layer is represented by MO$_X$F$_Y$ (M is Mg, or the like, 0≦X<2, and 0<Y≦4); the fluoride layer is obtained by reaction of a gaseous fluorinating agent with MgO or the like; fluorine gas, hydrogen fluoride gas, BF$_3$, SbF$_5$ or SF$_4$ is used as the gaseous fluorinating agent; or the thickness of the fluoride layer is set in the range of 0.1 to 1000 nm; the above effect can be significantly exhibited.

The film body may be formed on the surface of the substrate and then surface-treated with a gaseous fluorinating agent to form a fluoride layer on the surface of the film body. In this case, MgO or the like in the film body is little degenerated to MgCO$_3$ and Mg(OH)$_2$, etc. which are harmful to the function of FPD, thereby shortening the time of the subsequent degassing step for removing MgCO$_3$ and Mg(OH)$_2$, etc. or omitting the degassing step, decreasing the manufacturing cost of FPD.

The film body may be formed on the surface of the substrate in a vacuum, and then surface-treated with a gaseous fluorinating agent in a vacuum or an inert gas atmosphere without exposure to air to form a fluoride layer on the surface of the film body. This can prevent or suppress the production of carbonate (MgCO$_3$ or the like) and hydroxide (Mg(OH)$_2$ or the like) of MgO or the like, which are harmful to FPD, on the surface of the film body.

The film body may be formed on the substrate of the substrate in a vacuum, exposed to air and then activated by burning in air, and further surface-treated with a gaseous fluorinating agent to form a fluoride layer on the surface of the film body. In this case, even when carbonate (MgCO$_3$ or the like) and hydroxide (Mg(OH)$_2$ or the like) of MgO or the like, which are harmful to FPD, are formed on the surface of the film body, the film body is activated by burning to remove carbonate (MgCO$_3$ or the like) and hydroxide (Mg(OH)$_2$ or the like) of MgO or the like, which are formed on the surface of the film body, as CO$_2$ and H$_2$O. In this state, the fluoride layer is formed on the surface of the film body to protect the surface of the film body by the fluoride layer, thereby preventing or suppressing the formation of carbonate (MgCO$_3$ or the like) and hydroxide (Mg(OH)$_2$ or the hydroxide of MgO or the like can be significantly prevented or suppressed by fluorination without exposure to air after MgO or the like is deposited in a vacuum.

The substrate surface on which the film body and the fluoride layer are formed may be burned in air before, during or after assembly to activate the film body. In this case, when hydroxide (Mg(OH)$_2$ or the like) of MgO or the like is slightly formed on the film body, the hydroxide can be removed as H$_2$O, thereby decreasing the rate of recontamination of the film body with atmospheric moisture.

The film body may be formed on the surface of the substrate by using paste or dispersion for a film which is prepared by mixing a binder and a MgO powder or the like coated with a fluoride layer by surface-treating the MgO powder or the like with a gaseous fluorinating agent. In this case, since the MgO powder or the like in the film body is little degenerated to MgCO$_3$ and Mg(OH)$_2$, etc. which are harmful to the function of FPD, thereby shortening the time of the subsequent degassing step for removing MgCO$_3$ and Mg(OH)$_2$, etc. or omitting the degassing step, decreasing the manufacturing cost of FPD, as described above.

Where the film body or MgO powder or the like is surface-treated with a gaseous fluorinating agent at pressure of 1 to 760 Torr; or fluorine gas, hydrogen fluoride gas, BF$_3$, SbF$_5$ or SF$_4$ is used as the gaseous fluorinating agent; it is possible to relatively easily form the fluoride layer having the high secondary-electron emitting ability on the surface of the film body or the MgO powder or the like.

In manufacturing FPD by using the above-mentioned protecting film, the number of steps for manufacturing FPD can be significantly decreased, and thus FPD can be manufactured at low cost.

The protecting film composed of an alkali earth metal oxide or the like may be formed on the surface of the substrate, and then surface-treated with a gaseous fluorinating agent to form a fluoride layer on the surface of the protecting film, followed by removal of the fluoride layer after assembly of FPD using the substrate. In this case, even when the protecting film is exposed to air for a long time in the process for manufacturing FPD, the protecting film little reacts with CO$_2$ gas and H$_2$O gas in air. As a result, the alkali earth metal oxide or the like of the protecting film is little degenerated to carbonate and hydroxide, etc. which have the probability of deteriorating the function of FPD, thereby improving the environment resistance of the protecting film. On the other hand, the occurrence of cracks in the fluoride layer and separation of the fluoride layer can be prevented due to good matching between the fluoride layer and the protecting layer, thereby improving the degeneration protecting effect of the protecting film.

Furthermore, where the fluoride layer is represented by MO$_X$F$_Y$ (M is an alkali earth metal, or the like, $0 \leq X < 2$, and $0 < Y \leq 4$); the fluoride layer is obtained by reaction of a gaseous fluorinating agent with an alkali earth metal or the like; fluorine gas, hydrogen fluoride gas, BF$_3$, SbF$_5$ or SF$_4$ is used as the gaseous fluorinating agent; or the thickness of the fluoride layer is set in the range of 0.1 to 1000 nm; the above effect can be significantly exhibited.

In the protecting film and FPD produced by the above-mentioned method, the fluoride layer is removed after assembly of FPD, improving the discharge characteristics of FPD.

What is claimed is:

1. A FPD protecting film comprising:
   a film body comprising of any one of MgO, CaO, SrO, BaO, alkali earth compound oxides, rare earth oxides, or compound oxides of alkali earth oxides and rare earth oxides, wherein the film body is present on the surface of a substrate; and
   a fluoride layer present on the surface of the film body, wherein the fluoride layer is represented by the formula

MO$_X$F$_Y$, wherein M is Mg, Ca, Sr, Ba, an alkali earth complex metal, a rare earth metal, or a complex metal of an alkali earth metal and rare earth metal, $0 < X < 2$ and $1 \leq Y \leq 4$.

2. The FPD protecting film according to claim 1, wherein the fluoride layer is obtained by reaction of a gaseous fluorinating agent with any one selected from the group consisting of MgO, CaO, SrO, BaO, an alkali earth compound oxide, a rare earth oxide, and a compound oxide of alkali earth oxides and rare earth oxides.

3. The FPD protecting film according to claim 2, wherein the gaseous fluorinating agent comprises a fluorine gas, a hydrogen fluoride gas, BF$_3$, SbF$_5$ or SF$_4$.

4. A FPD protecting film according to claim 1, wherein the thickness of the fluoride layer is 0.1 to 1000 nm.

5. A FPD comprising a protecting film according to claim 1.

* * * * *